(12) United States Patent
De Luxán Hernández et al.

(10) Patent No.: US 12,452,421 B2
(45) Date of Patent: *Oct. 21, 2025

(54) PARTITION-BASED INTRA-CODING CONCEPT

(71) Applicant: Fraunhofer-Gesellschaft zur Foerderung der angewandten Forschung e.V., Munich (DE)

(72) Inventors: Santiago De Luxán Hernández, Berlin (DE); Heiko Schwarz, Berlin (DE); Detlev Marpe, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 43 days.

This patent is subject to a terminal disclaimer.

(21) Appl. No.: 18/525,275

(22) Filed: Nov. 30, 2023

(65) Prior Publication Data

US 2024/0155126 A1   May 9, 2024

Related U.S. Application Data

(63) Continuation of application No. 16/986,628, filed on Aug. 6, 2020, now Pat. No. 11,956,429, which is a
(Continued)

(30) Foreign Application Priority Data

Feb. 9, 2018  (EP) ..................... 18156169
Jul. 13, 2018  (EP) ..................... 18183571
Jan. 2, 2019  (EP) ..................... 19150108

(51) Int. Cl.
*H04N 19/119*  (2014.01)
*H04N 19/11*   (2014.01)
(Continued)

(52) U.S. Cl.
CPC ........... *H04N 19/119* (2014.11); *H04N 19/11* (2014.11); *H04N 19/12* (2014.11); *H04N 19/129* (2014.11);
(Continued)

(58) Field of Classification Search
None
See application file for complete search history.

(56) References Cited

U.S. PATENT DOCUMENTS 11,956,429 B2 * 4/2024 De Luxán Hernández .................. H04N 19/159
2012/0307894 A1   12/2012 Chien et al.
(Continued)

FOREIGN PATENT DOCUMENTS

EP  2751999 B1  1/2016
EP  3288264 A1  2/2018
(Continued)

OTHER PUBLICATIONS

Examination Report, dated Aug. 4, 2021, received in Indian Patent Application No. 202017033746, filed Aug. 6, 2020.
(Continued)

*Primary Examiner* — Kaitlin A Retallick
(74) *Attorney, Agent, or Firm* — Conley Rose, P.C.

(57) ABSTRACT

Block-based coding of a picture is rendered more effective by providing an intra-prediction coding concept according to which a certain block of the picture is intra-prediction coded using a certain intra-coding mode by partitioning the predetermined block into partitions along a certain dimension with the number of partitions being greater than two and/or the partitions being one sample wide along the certain dimension with the partitions being, for reconstruction purposes, sequentially subject to spatial prediction using the intra-prediction coding mode signaled for the certain block
(Continued)

followed by correcting the thus obtained predictor using a prediction residual so that for preceding partitions a reconstruction of the samples is available to the decoder at the time of processing the next, then current, partition. Signaling overhead with respect to the partitioning may be left off or may be kept low.

20 Claims, 13 Drawing Sheets

Related U.S. Application Data continuation of application No. PCT/EP2019/053058, filed on Feb. 7, 2019.

(51) Int. Cl.
*H04N 19/12* (2014.01)
*H04N 19/129* (2014.01)
*H04N 19/174* (2014.01)
*H04N 19/176* (2014.01)
*H04N 19/46* (2014.01)
*H04N 19/593* (2014.01)
*H04N 19/61* (2014.01)

(52) U.S. Cl.
CPC ......... *H04N 19/174* (2014.11); *H04N 19/176* (2014.11); *H04N 19/46* (2014.11); *H04N 19/593* (2014.11); *H04N 19/61* (2014.11)

(56) References Cited

U.S. PATENT DOCUMENTS

| | | | |
|---|---|---|---|
| 2013/0070848 A1 | 3/2013 | Guo et al. | |
| 2013/0251026 A1* | 9/2013 | Guo | H04N 19/136 375/240.02 |
| 2014/0355679 A1* | 12/2014 | Rosewarne | H04N 19/176 375/240.12 |
| 2017/0094274 A1 | 3/2017 | Chien | |
| 2019/0045198 A1* | 2/2019 | Mahdi | H04N 19/103 |
| 2020/0396463 A1* | 12/2020 | Zhang | H04N 19/186 |

FOREIGN PATENT DOCUMENTS

| | | |
|---|---|---|
| EP | 2805485 B1 | 3/2019 |
| JP | 2014519764 A | 8/2014 |
| JP | 2014530544 A | 11/2014 |
| KR | 20170078874 A | 7/2017 |
| WO | 2013040370 A1 | 3/2013 |

OTHER PUBLICATIONS

Deluxan Hernandez, Santiago, et al., "CE3: Line-based intra coding mode (Tests 1.4.1, 1.4.2 and 1.4.3)", Joint Video Experts Team (JVET) of ITU-T SG 16 WP 3 and ISO/IEC JTC 1/SC 29/WG 11 11th Meeting: Ljubljana, SI, Jul. 10-18, 2018, [JVET-K0049-v1], JVET-K0049 (version 1 ), ITU-T, <URL: http://phenix.itsudparis.eu/jvet/doc_end_user/documents/11_Ljubljana/wg11/JVET-K0049-v1.zip>: JVET-K0049_v1 .docx:, pp. 1-8.

Lai, Changcai, et al., "New intra prediction using the correlation between pixels and lines", Joint Collaborative Team on Video Coding (JCT-VC) of ITU-T SG16 WP3 and ISO/IEC JTC1/SC29/WG11 2nd Meeting: Geneva, CH, Jul. 21-28, 2010, [JCTVC-B040], JCTVC-B040 (version 1), ITU-T, Jul. 2010 <URL: http://phenix.itsudparis.eu/jct/doc_end_user/documents/20_Geneva/wg11/JCTVC-B040.zip>: JCTVC-B040.doc:, pp. 1-4.

Xu, Jun, et al., "Non-CE6: Improvements for SDIP", Joint Collaborative Team on Video Coding (JCT-VC) of ITU-T SG16 WP3 and ISO/IEC JTC1/SC29/WG11 7th Meeting: Geneva, CH, Nov. 21-30, 2011, [JCTVCG354r2], JCTVC-G354 (version 4) ITU-T <URL:http://phenix.itsudparis.eu/jct/doc_end_user/documents/7 Geneva/wg11/JCTVCG354-v4.zip>: JCTVCG354_r2.doc:, pp. 1-4.

Bross, B, et al., "Versatile Video Coding, Draft 4", JVET ITUT TSG 16 WP3 and ISO-IEC JTC 1 SC 29 WG 11 JVET M1001-v1.

* cited by examiner

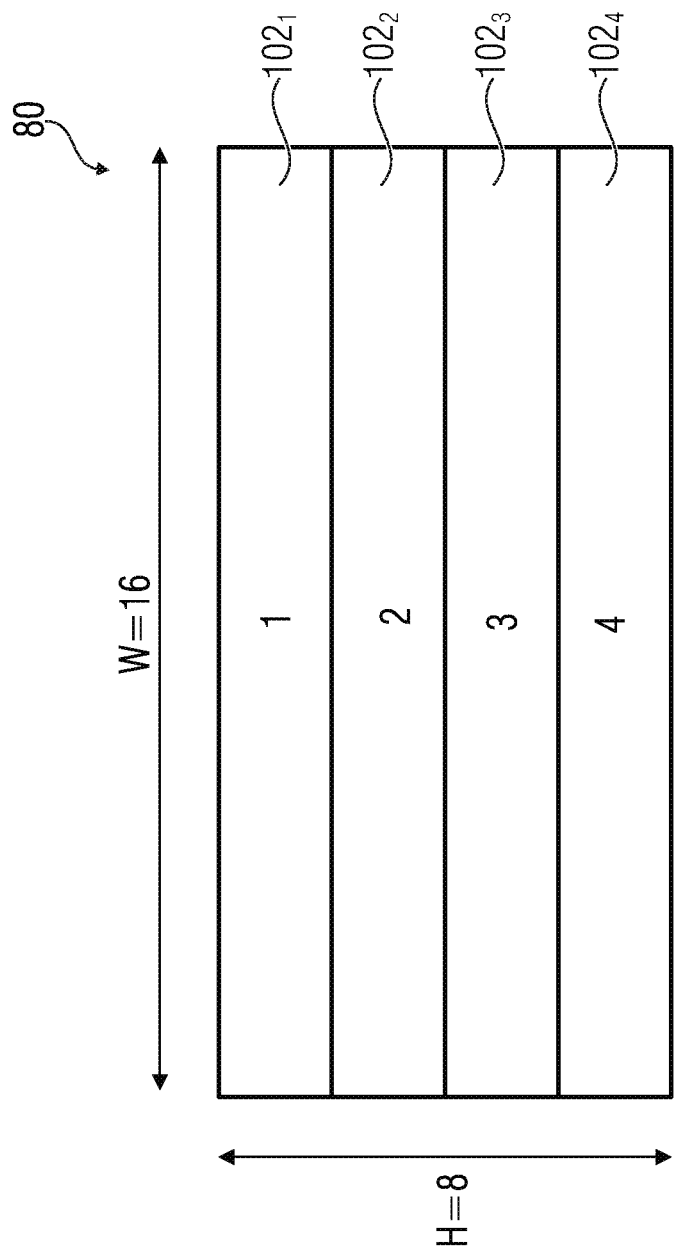

PARTITION-BASED INTRA-CODING CONCEPT

CROSS-REFERENCES TO RELATED APPLICATIONS

This application is a continuation of U.S. patent application Ser. No. 16/986,628, filed Aug. 6, 2020, which in turn is a continuation of International Application No. PCT/EP2019/053058, filed Feb. 7, 2019, which is incorporated herein by reference in its entirety, and additionally claims priority from European Applications Nos. EP 18156169.7, filed Feb. 9, 2018, EP 18183571.1, filed Jul. 13, 2018, and EP 19150108.9, filed Jan. 2, 2019, all of which are incorporated herein by reference in their entirety.

The present application is concerned with an intra-coding concept for use in a block-based codec such as, for example, a hybrid video codec.

BACKGROUND OF THE INVENTION

Given a certain block, intra prediction is carried out in HEVC by extrapolating the decoded boundary samples of the neighboring blocks following certain patterns, namely 33 angular modes and a DC and a planar modes [1]. The one intra prediction mode that minimizes the rate-distortion cost is then signaled to the decoder. Despite the known codecs supporting many Intra Prediction Modes (IPMs), the intra prediction achieved thereby is still subject of development to find better intra predictors leading to higher coding efficiency. This does not only pertain to HEVC but also to other block-based codecs using intra-prediction. Finding a set of intra-prediction modes which are suitable for efficiently coding the inner of blocks involves taking into account the overhead for signaling the intra-prediction mode in terms of signaling overhead and the resulting quality of the predictor obtained by these intra-prediction modes due to the fact that a more accurate predictor reduces the prediction residual, thereby reducing the signaling overhead associated with coding the prediction residual. In order to keep the signaling overhead associated with the intra-prediction modes low, intra-predicted blocks should be large, i.e. the granularity at which the intra prediction mode is signaled should be kept coarse, but on the other hand, spatial prediction of larger blocks tends to be less accurate owing to a higher mean sample distance of the samples in the inner of the intra-predicted block, i.e. the ones to be predicted, to the already decoded/encoded samples neighboring this block, i.e. the reference samples. HEVC alleviates this catch-22 a little bit by allowing the transform residual blocks to inherit the intra-prediction mode of their corresponding coding unit relative to which the transform residual blocks form leaf blocks into which the coding unit is sub-divided by multi-tree subdivisioning. However, this still involves signaling overhead for signaling from encoder to decoder the sub-partitioning of respective intra-coded coding units into the transform blocks.

Thus, it would be favorable to have a concept at hand which further increases the coding efficiency of intra-coding.

SUMMARY

According to an embodiment, a decoder for block-based decoding of a picture from a data stream may be configured to: decode an intra-coding mode for a predetermined bock of the picture from the data stream; partition, along a predetermined dimension, the predetermined block into partitions, wherein the number of partitions is greater than 2 and/or the partitions are one sample wide along the predetermined dimension; sequentially reconstruct the partitions of the predetermined block according to a predetermined partition order which sequentially traverses the partitions along the predetermined dimension by, for a current partition and before proceeding with a subsequent partition, deriving a predictor for the current partition by filling the current partition depending on one or more already reconstructed samples neighboring the current partition in a manner depending on the intra-coding mode; reconstructing the current partition by correcting the predictor using a prediction residual signaled in the data steam.

According to another embodiment, an encoder for block-based encoding of a picture into a data stream may be configured to: determine an intra-coding mode for a predetermined bock of the picture and signal the intra-coding mode in the data stream; partition, along a predetermined dimension, the predetermined block into partitions, wherein the number of partitions is greater than 2 and/or the partitions are one sample wide along the predetermined dimension; sequentially subject the partitions of the predetermined block according to a predetermined partition order which sequentially traverses the partitions along the predetermined dimension to a prediction by, for a current partition and before proceeding with a subsequent partition, deriving a predictor for the current partition by filling the current partition depending on one or more already encoded samples neighboring the current partition in a manner depending on the intra-coding mode; determining a prediction residual for use in correcting the predictor for reconstructing the current partition, signal the prediction residual of the partitions in the data steam.

According to another embodiment, a method for block-based decoding of a picture from a data stream may have the steps of: decoding an intra-coding mode for a predetermined bock of the picture from the data stream; partitioning, along a predetermined dimension, the predetermined block into partitions, wherein the number of partitions is greater than 2 and/or the partitions are one sample wide along the predetermined dimension; sequentially reconstructing the partitions of the predetermined block according to a predetermined partition order which sequentially traverses the partitions along the predetermined dimension by, for a current partition and before proceeding with a subsequent partition, deriving a predictor for the current partition by filling the current partition depending on one or more already reconstructed samples neighboring the current partition in a manner depending on the intra-coding mode; reconstructing the current partition by correcting the predictor using a prediction residual signaled in the data steam.

According to another embodiment, a method for block-based encoding of a picture into a data stream may have the steps of: determining an intra-coding mode for a predetermined bock of the picture and signal the intra-coding mode in the data stream; partitioning, along a predetermined dimension, the predetermined block into partitions, wherein the number of partitions is greater than 2 and/or the partitions are one sample wide along the predetermined dimension; sequentially subjecting the partitions of the predetermined block according to a predetermined partition order which sequentially traverses the partitions along the predetermined dimension to a prediction by, for a current partition and before proceeding with a subsequent partition, deriving a predictor for the current partition by filling the current partition depending on one or more already encoded samples neighboring the current partition in a manner depending on the intra-coding mode; determining a prediction residual for use in correcting the predictor for reconstructing the current partition, signaling the prediction residual of the partitions in the data steam.

Another embodiment may have a non-transitory digital storage medium having a computer program stored thereon to perform the method for block-based decoding of a picture from a data stream, the method having the steps of: decoding an intra-coding mode for a predetermined bock of the picture from the data stream; partitioning, along a predetermined dimension, the predetermined block into partitions, wherein the number of partitions is greater than 2 and/or the partitions are one sample wide along the predetermined dimension; sequentially reconstructing the partitions of the predetermined block according to a predetermined partition order which sequentially traverses the partitions along the predetermined dimension by, for a current partition and before proceeding with a subsequent partition, deriving a predictor for the current partition by filling the current partition depending on one or more already reconstructed samples neighboring the current partition in a manner depending on the intra-coding mode; reconstructing the current partition by correcting the predictor using a prediction residual signaled in the data steam, when said computer program is run by a computer.

Another embodiment may have a non-transitory digital storage medium having a computer program stored thereon to perform the method for block-based encoding of a picture into a data stream, the method having the steps of: determining an intra-coding mode for a predetermined bock of the picture and signal the intra-coding mode in the data stream; partitioning, along a predetermined dimension, the predetermined block into partitions, wherein the number of partitions is greater than 2 and/or the partitions are one sample wide along the predetermined dimension; sequentially subjecting the partitions of the predetermined block according to a predetermined partition order which sequentially traverses the partitions along the predetermined dimension to a prediction by, for a current partition and before proceeding with a subsequent partition, deriving a predictor for the current partition by filling the current partition depending on one or more already encoded samples neighboring the current partition in a manner depending on the intra-coding mode; determining a prediction residual for use in correcting the predictor for reconstructing the current partition, signaling the prediction residual of the partitions in the data steam, when said computer program is run by a computer.

Another embodiment may have a data stream generated by an inventive method for block-based decoding of a picture from a data stream.

The present invention is based on the finding that block-based coding of a picture may be rendered more effective by providing an intra-prediction coding concept according to which a certain block of the picture is intra-prediction coded using a certain intra-coding mode by partitioning the predetermined block into partitions along a certain dimension with the number of partitions being greater than two and/or the partitions being one sample wide along the certain dimension with the partitions being, for reconstruction purposes, sequentially subject to spatial prediction using the intra-prediction coding mode signaled for the certain block followed by correcting the thus obtained predictor using a prediction residual so that for preceding partitions a reconstruction of the samples is available to the decoder at the time of processing the next, then current, partition. Signaling overhead with respect to the partitioning may be left off or may be kept low. For instance, merely signaling with respect to the partitioning dimension may be spent in the data stream such as distinguishing between a partitioning along the vertical axis, thereby partitioning the predetermined block into horizontal slices of the predetermined block having the width of the predetermined block, and partitioning along the horizontal axis, thereby partitioning the predetermined block into vertical slices of the predetermined block having the height of the predetermined block. The number of partitions may be inherently clear by having the number of partitions, for instance, agreed between encoder and decoder, with encoder and decoder splitting the predetermined block into this number of partitions, or by partitioning the predetermined block in as many partitions as the predetermined block is dimensioned in units of samples along the predetermined dimension so that each partition is one sample wide along the partition dimension, i.e. by partitioning into such one sample wide partitions. Thus, the partitioning enables to keep the signaling overhead of a predetermined block for which an intra-prediction mode is signaled in the data stream as a whole low with nevertheless providing encoder and decoder with the opportunity to lower the mean distance of the samples of the predetermined block from their already reconstructed/encoded neighboring reference samples. The latter at least partially lie within the predetermined block itself, namely within previously processed partitions for which the prediction residual has already been determined so as to be available for correction of the predictor used for the partition they are located in.

BRIEF DESCRIPTION OF THE DRAWINGS

Embodiments of the present invention will be detailed subsequently referring to the appended drawings, in which.

DETAILED DESCRIPTION OF THE INVENTION

The following description of the figures starts with a presentation of a description of encoder and decoder of a block-based predictive codec for coding pictures of a video in order to form an example for a coding framework into which embodiments for an intra-prediction codec may be built in. The former encoder and decoder are described with respect to FIGS. 1 to 3. Thereinafter the description of embodiments of the intra-prediction concept of the present application are presented along with a description as to how such concepts could be built into the encoder and decoder of FIGS. 1 and 2, respectively, although the embodiments described with the subsequent FIG. 4 and following, may also be used to form encoder and decoders not operating according to the coding framework underlying the encoder and decoder of FIGS. 1 and 2.

Figure 1:
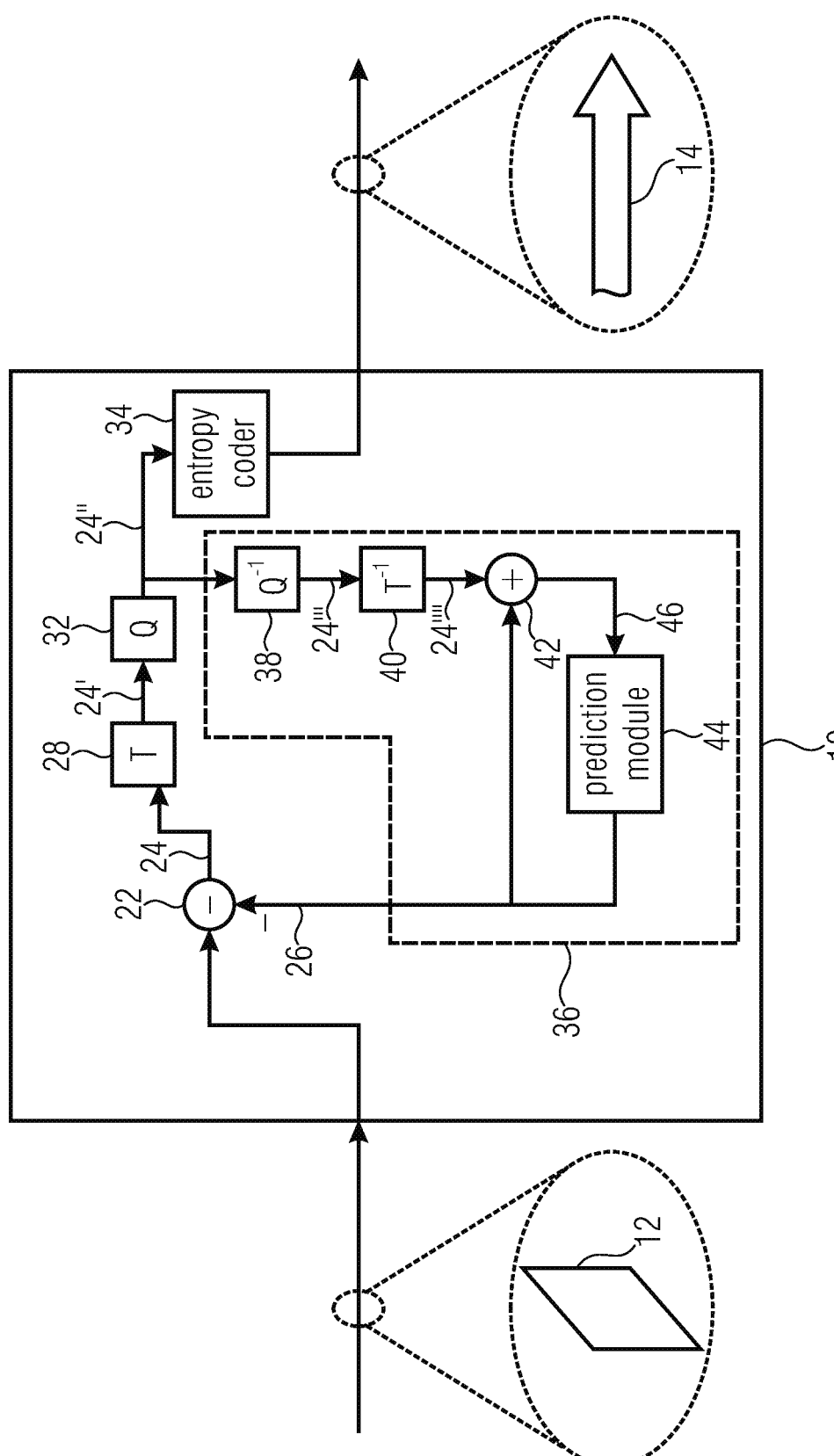
FIG. 1 shows a block diagram of an apparatus for predictively coding a picture as an example for an encoder where an intra prediction concept according to embodiments of the present application could be implemented.
Figure 2:
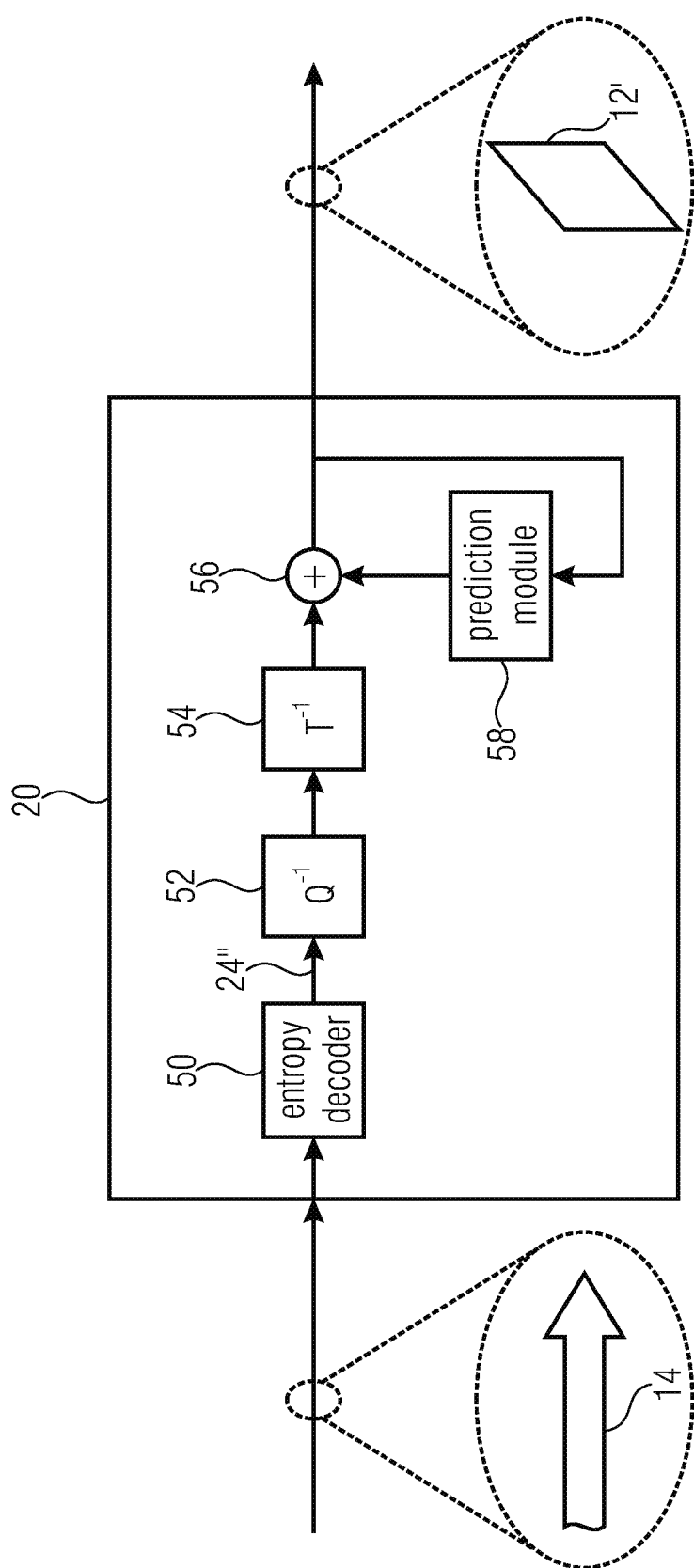
FIG. 2 shows a block diagram of an apparatus for predictively decoding a picture, which fits to the apparatus of FIG. 1, as an example for decoder where an intra prediction concept according to embodiments of the present application could be implemented.

FIG. 1 shows an apparatus for predictively coding a picture 12 into a data stream 14 using exemplarily using transform-based residual coding. The apparatus, or encoder, is indicated using reference sign 10. FIG. 2 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by decoder 20 deviates from picture 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. the picture 12. The prediction residual signal former 22 may, for instance, be a subtractor which subtracts the prediction signal from the original signal, i.e. picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction residual 26 is generated by a prediction stage 36 of encoder 10 on the basis of the prediction residual signal 24" decoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra prediction, and/or temporal prediction, i.e. inter prediction.

Likewise, decoder 20 may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 2, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, or instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24″, data stream 14 may have encoded thereinto coding mode parameters for assigning the coding modes to the various blocks, prediction parameters for some of the blocks, such as motion parameters for inter-coded segments, and optional further parameters such as parameters controlling and signaling the subdivision of picture 12 and 12′, respectively, into the segments. The decoder 20 uses these parameters to subdivide the picture in the same manner as the encoder did, to assign the same prediction modes to the segments, and to perform the same prediction to result in the same prediction signal.

Figure 3:
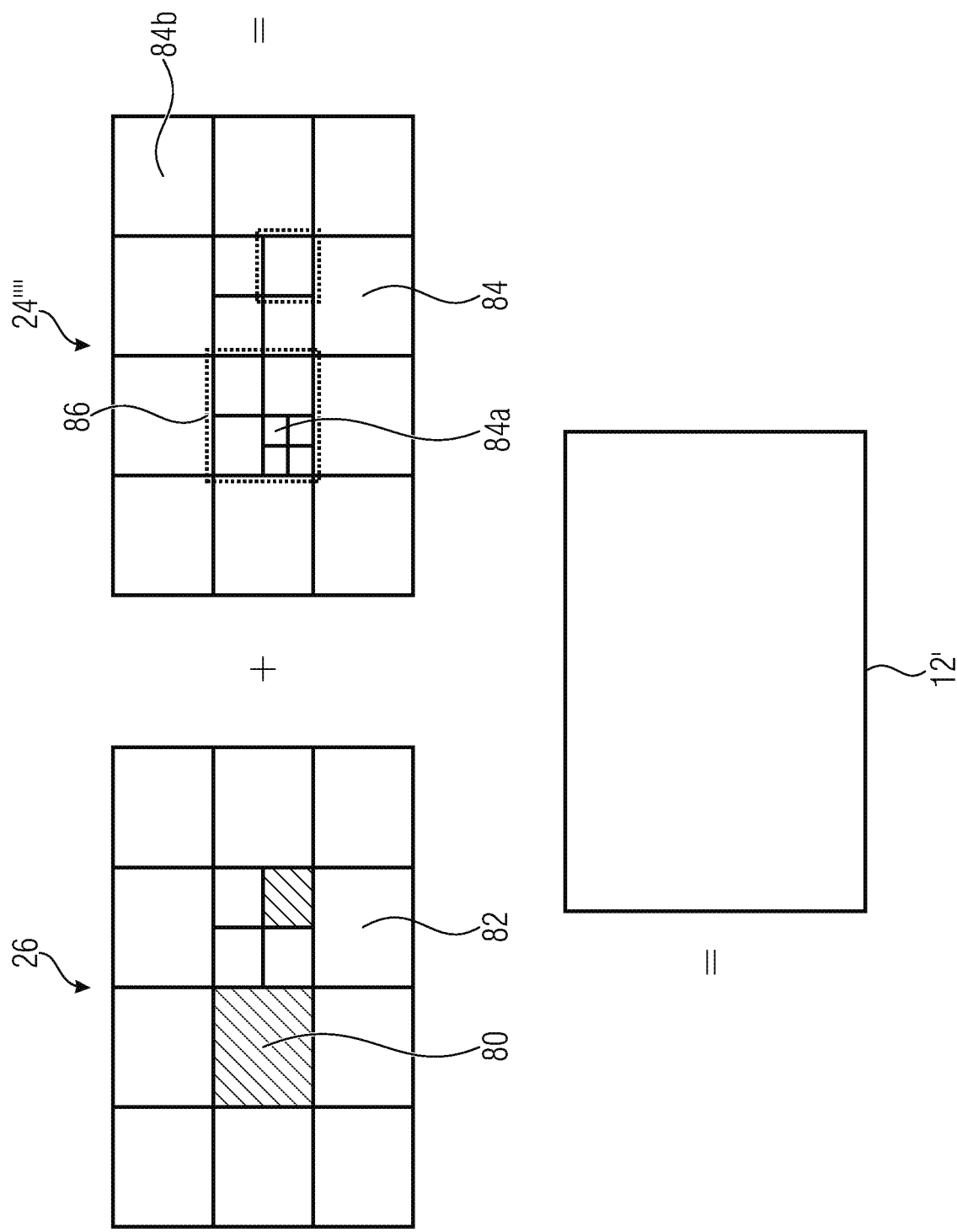
FIG. 3 shows a schematic diagram illustrating an example for a relationship between the prediction residual signal, the prediction signal and the reconstructed signal so as to illustrate possibilities of setting subdivisions for coding mode selection, transform selection and transform performance, respectively.

FIG. 3 illustrates the relationship between the reconstructed signal, i.e. the reconstructed picture 12′, on the one hand, and the combination of the prediction residual signal 24″″ as signaled in the data stream, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of blocks or blocks, or a multi-tree subdivision of picture 12 into leaf blocks of varying size, such as a quadtree subdivision or the like, into blocks, wherein a mixture thereof is illustrated in FIG. 3 where the picture area is first subdivided into rows and columns of tree-root blocks which are then further subdivided in accordance with a recursive multi-tree subdivisioning. Again, data stream 14 may have an intra-coding mode coded thereinto for intra-coded blocks 80, which assigns one of several supported intra-coding modes to the respective intra-coded block 80. Further details are described below. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively. The prediction residual signal 24″″ in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12′, respectively, into blocks, namely one subdivisioning into coding blocks 80 and 82, respectively, and another subdivision into blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80/82 so that any border between two blocks of blocks 80 and 82 overlays a border between two blocks 84, or alternatively speaking each block 80/82 either coincides with one of the transform blocks 84 or coincides with a cluster of transform blocks 84. However, the subdivisions may also be determined or selected independent from each other so that transform blocks 84 could alternatively cross block borders between blocks 80/82. As far as the subdivision into transform blocks 84 is concerned, similar statements are thus true as those brought forward with respect to the subdivision into blocks 80/82, i.e. the blocks 84 may be the result of a regular subdivision of picture area into blocks/blocks, arranged in rows and columns, the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 3 illustrates that the combination of the prediction signal 26 and the prediction residual signal 24″″ directly results in the reconstructed signal 12′. However, it should be noted that more than one prediction signal 26 may be combined with the prediction residual signal 24″″ to result into picture 12′ in accordance with alternative embodiments.

In FIG. 3, the transform segments 84 shall have the following significance. Transformer 28 and inverse transformer 54 perform their transformations in units of these transform segments 84. For instance, many codecs use some sort of DST or DCT for all transform blocks 84. Some codecs allow for skipping the transformation so that, for some of the transform segments 84, the prediction residual signal is coded in in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

The subsequent description provides more details on which transforms could be supported by encoder 10 and decoder 20. In any case, it should be noted that the set of supported transforms may comprise merely on transform such as one spectral-to-spatial or spatial-to-spectral transform.

As already outlined above, FIGS. 1-3 have been presented as an example where the intra-prediction concept described further below may be implemented in order to form specific examples for encoders and decoders according to the present application. Insofar, the encoder and decoder of FIGS. 1 and 2, respectively, represent possible implementations of the encoders and decoders described herein below. As will be outlined in more detail below, when having the subsequently explained embodiments for intra-prediction according to the present application built into the encoder and decoder of FIGS. 1 and 2, the encoder of FIG. 1 and the decoder of FIG. 2 support, at least as one option, to process an intra-predicted block 80 in the manner outlined in more detail below. Thus, the embodiments described hereinafter refer to an encoder which equals the encoder 10 of FIG. 1 which treats intra-coded blocks 80 in the manner outlined in more detail below and the same applies with respect to the decoder of FIG. 2 which, thus, represents an example for a decoder according to an embodiment where intra-coded blocks are treated in the manner outlined in more detail below. FIGS. 1 and 2 are, however, only specific examples. An encoder according to embodiments of the present application may, however, perform block-based encoding of a picture 12 using the concept outlined in more detail below and being different from the encoder of FIG. 1 such as, for instance, in that same is no video encoder, in that same does not support inter-prediction, or in that the sub-division into blocks 80 is performed in a manner different than exemplified in FIG. 3, or even in that this encoder does not use transform prediction residual coding with coding the prediction residual, for instance, in spatial domain directly instead. Likewise, decoders according to embodiments of the present application may perform block-based decoding of picture 12' from data stream 14 using the intra-prediction coding concept further outlined below, but may differ, for instance, from the decoder 20 of FIG. 2 in that same is no video decoder, but a still picture decoder, in that same does not support intra-prediction, or in that same sub-divides picture 12' into blocks in a manner different than described with respect to FIG. 3 and/or in that same does not derive the prediction residual from the data stream 14 in transform domain, but in spatial domain, for instance.

Figure 4:
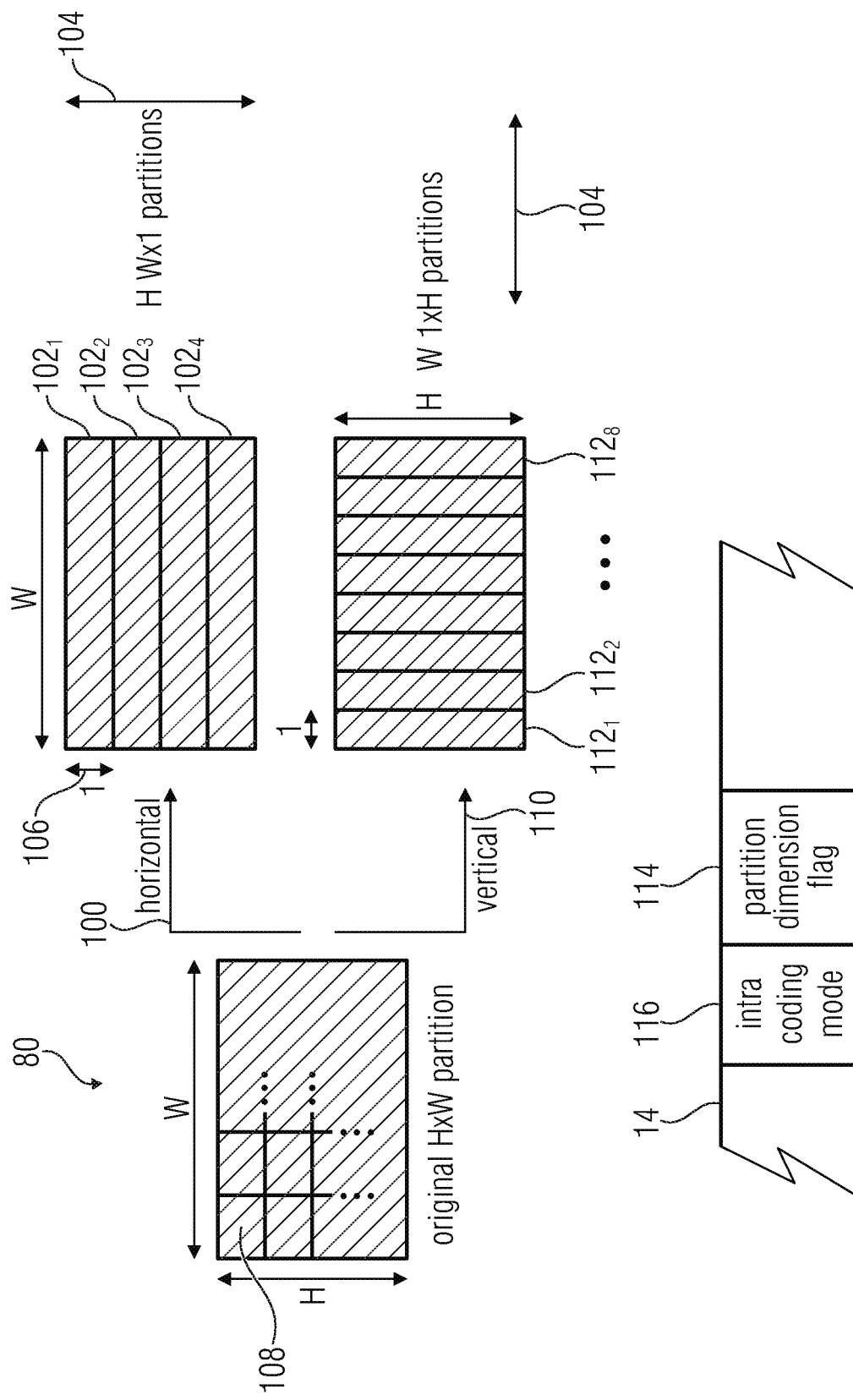
FIG. 4 shows a schematic diagram illustrating a partitioning treatment of an intra-coded block in accordance with an embodiment allowing for a selection between different partitioning dimensions, i.e., horizontal and vertical splits.

Having said this, the following description concentrates on the description of intra-prediction according to embodiments of the present application. According to the intra-prediction presented herein, intra-predicted blocks such as block 80 in FIG. 4 are allowed to be split into one-dimensional horizontal partitions or one-dimensional vertical partitions. The availability of treating blocks in that manner may be offered for intra-predicted blocks 80 of any size or be restricted to blocks 80 within a predefined range of blocks sizes only such as blocks greater than a certain size. "One-dimensional" refers to the fact that—when related to partitions being the result of partitioning—the partitions are merely one sample wide along partition dimension. One-dimensionality of the partitioning modes discussed herein, however, refers to the fact that the partitioning takes place along a certain dimension, with the resulting partitions being like stripes extending completely over the block in a direction transverse to the partitioning direction. See, for instance, FIG. 4. FIG. 4 shows the intra-predicted block 80, i.e., the block to be decoded or the block to be encoded, at the left hand side. It has dimension W×H. That is, it is a W×H dimensional block where H is the height and W is the width of block 80 measured in samples, respectively. According to FIG. 4, there are two split or partitioning options available, namely a horizontal split 100 according to which block 80 is split or partitioned into a number of partitions $102_1$, $102_2$, $102_3$ and $102_4$ along a vertical axis, i.e., the partition dimension 104. According to the example of FIG. 4, which is the example applied in the following description, each partition $102_1$ to $102_4$ is one sample wide as illustrated by the double headed arrow 106 so that the number of partitions $102_1$ to $102_4$ resulting from block 80 equals H, i.e., the height of block 80 in units of samples 108 of block 80, but it should be clear that the partitioning may be performed by encoder and decoder also according to a different manner agreed between encoder and decoder such as, for instance, a partitioning of block 80 along dimension 104 may be done in a manner leading to a predefined number of partitions $102_i$, the predefined number being greater than two, for instance, or a mixture thereof, with distributing the size of block 80 along the partition dimension evenly onto the predefined number of partitions.

The other coding option depicted in FIG. 4 and indicated by reference sign 110 corresponds to splitting block 80 into vertical partitions $112_1$, $112_2$, ... $112_8$. That is, according to option 110, block 80 is partitioned into partitions $112_i$ along the horizontal axis, i.e., a horizontal partition dimension 104. In case of option 100, each partition $102_i$ is as wide as block 80, i.e., has the block's width W, whereas the partitions $112_i$ adopt the height H of block 80, i.e. have height H. Summarizing, in a manner similar to the description of option 100, the vertical split 110 may split block 80 into a number W of partitions $112_i$ with W denoting the horizontal width of block 80 measured in samples 108 so that each partition $112_i$ is one sample wide in horizontal direction, wherein, however, the partitioning according to option 110 may also be performed in another manner agreed between encoder and decoder.

Thus, according to FIG. 4, the encoder is free to partition block 80 into H W×1 partitions $102_i$ according to the horizontal split option 100 or W 1×H partitions $112_i$ according to the vertical split option 110, and the split option chosen by the encoder for block 80 may be signaled in the data stream 14 for block 80 such as, for instance, by way of a corresponding partition dimension flag 114 in data stream 14. It should be clear, however, that embodiments of the present application also cover encoders and decoders which, by default, merely use one of options 100 and 110 without the need for flag 114 in the data stream. Even further, flag 114 may be conveyed in data stream 80 in other examples depending on the intra-coding mode 116 signaled in the data stream 14 for block 80 from encoder to decoder. The intra-coding mode may, as outlined above, indicate one out of a set of available/supported intra-coding modes including, for instance, angular modes and, optionally, one or more non-angular modes such as a DC mode or a planar mode. That is, flag 114 may, in accordance with alternative embodiments not further discussed hereinafter, be conveyed in data stream 14 in a manner conditionally depending on the intra-coding mode 116. According to the embodiments described hereinafter, flag 114 is present in data stream 14 for block 80 independent on the intra-coding mode 116 signaled for block 80 in data stream 14. A dependency may be, however, be present relative to a flag switching between the partitioning handling of intra-coded block 80 just-discussed and a different way of handling the intra-coding of block 80 as will be outlined hereinafter.

Figure 5:
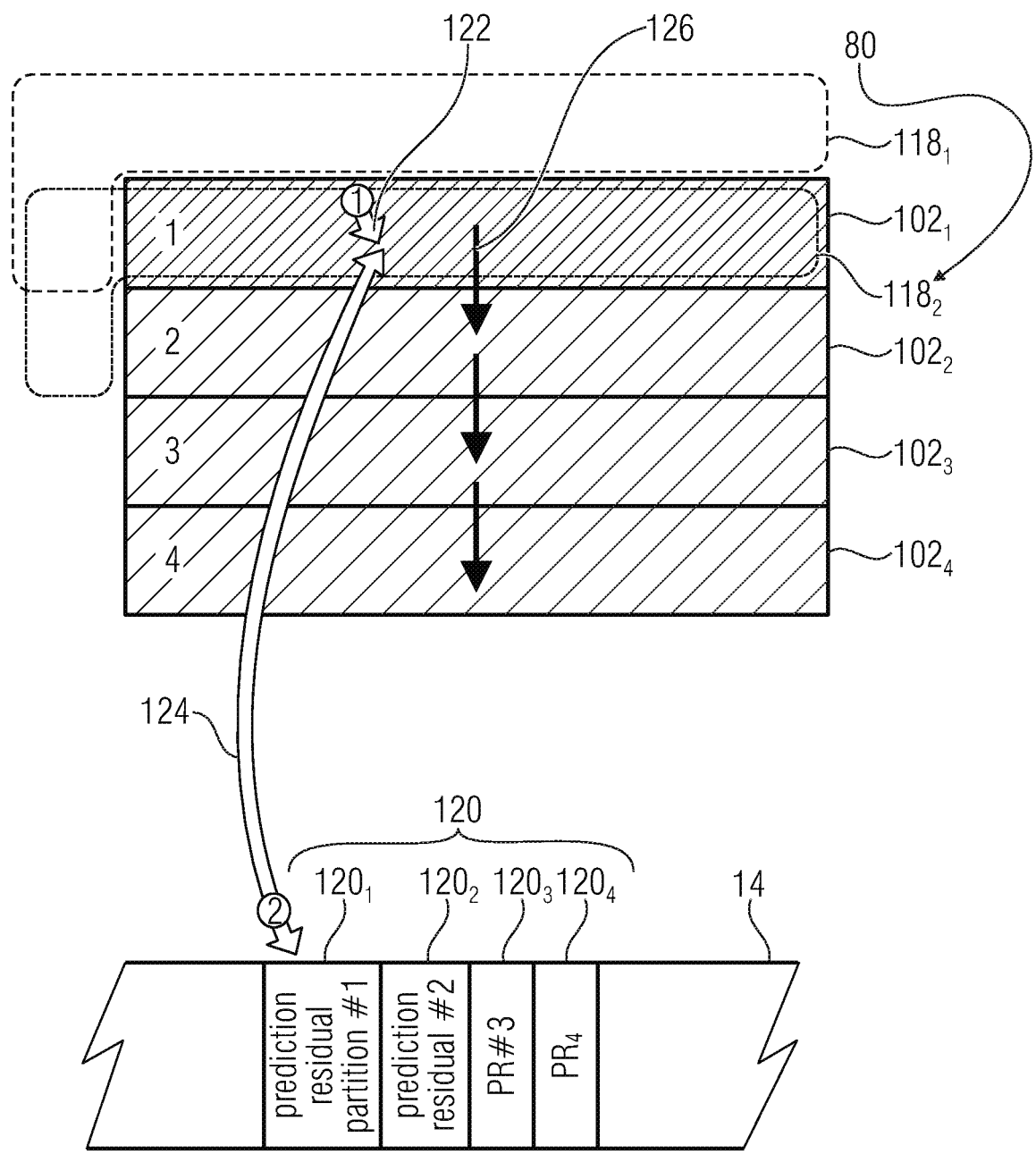
FIG. 5 shows a schematic diagram illustrating the sequential processing of the partitions of an intra-coded block treated according to the partitioning option.

According to embodiments of the present application, each of the partitions 102/112 is predicted, transformed, quantized and coded individually, with sequentially processing the partitions in this manner. Therefore, the reconstructed samples of a certain partition will be able to be used to predict any following partition 102/112 in partition order among the partitions into which block 80 has been partitioned, and in this manner, the process of intra-prediction cycles through the partitions 102/112 into which block 80 has been partitioned. FIG. 5 exemplarily shows an intra-predicted block 80 split according to option 100. Each partition $102_1$ to $102_4$ of block 80 is subject to prediction, i.e., derivation of the predictor of the respective partition $102_i$, and prediction residual related task, namely the correction of the predictor using the prediction residual. The latter task may be performed by combining the prediction residual and the predictor. This is done in the decoder for reconstruction. The encoder performs as prediction residual related task the determination of the prediction residual involving, for instance, transformation and quantization, as well as the correction of the predictor using the prediction residual, namely in order to keep the prediction loop synchronized to the decoder by filling the decoded picture buffer in the encoder with the reconstruction of the picture. The just-mentioned tasks, i.e. prediction and residual handling, are performed individually for, and sequentially among, partitions $102_1$ to $102_4$. After those two steps for a currently processed partition, the next partition $102_i$ according to the partition order is processed the same way. The partition order is exemplarily illustrated in FIG. 5 using the three arrows 126.

FIG. 5 illustrates that the partition including the upper most left pixel of block 80 would be treated first before proceeding with the immediately lower neighbor partition $102_2$ and so forth, corresponding to the assignment of indices to partitions $102_1$ to $102_4$ in FIG. 5, but this order is merely an example and as the following description will render clear, this partition order may be chosen in a manner depending on other settings such as the intra-coding mode and/or the size of block 80 with the former dependency being discussed hereinafter.

In the examples discussed further below, the partition order 126 merely varies between ones traversing the partitions 102/112 in a manner so that immediately succeeding partitions immediately neighbor each other so that, in case of split type 100, the partition order leads from top to bottom or bottom to top, and in case of partition type 110 from left to right or right to left, respectively. It should be mentioned, however, that other examples are imaginable too. For instance, the partition order could be chosen in a manner so that the partitions are scanned in the just-outlined neighboring order in two scans with, in the first scan, processing every second partition from top to bottom, bottom to top, left to right or right to left, whatever applies, and then processing in the same direction of order, or in the opposite direction, the remaining partitions therebetween.

In any case, FIG. 5 illustrates the first partition $102_1$ to be processed first and to be the currently processed partition. For the first partition, here exemplarily $102_1$, the set of neighboring samples $118_1$ used to form the predictor for partition $102_1$ may merely be chosen on the basis of samples lying outside the boarders of block 80 as at the time of processing the first partition of block 80, no sample of block 80 has been processed yet, i.e., reconstructed or encoded. That is, the samples in set $118_1$ are already reconstructed in the encoder using any prediction and correction of the corresponding predictor using a prediction residual transmitted in the data stream. They belong to previously coded/decoded picture blocks and may be inter-coded or intra-coded or any other coded block. As to number and exact position of the samples of the set $118_1$ of neighboring samples which are used for forming the predictor of the first partition $102_1$, same depend on the intra-coding mode assigned to block 80. This intra-coding mode is jointly, or equally, used for the processing of every partition of block 80 as will be discussed in the following. In order to finish the processing of the first partition $102_1$, the predictor for this partition $102_1$ derived in decoder and encoder by filling this partition $102_1$ depending on the one or more already reconstructed/encoded samples in set $118_1$, its prediction residual is determined as far the encoder is concerned, namely by transformation and quantization as outlined above, and then this prediction residual is—in the version transmitted in the data stream, i.e. including the quantization loss—used for reconstruction of this partition $102_1$ by correcting the predictor using the prediction residual in the data stream 14. FIG. 5, for instance, shows the prediction residual for partition $102_1$ exemplarily at $120_1$. That is, $120_1$ comprises the transform coefficients corresponding to the transform of the prediction residual of partition $102_1$ with a description of data $120_1$ being discussed in more detail below.

Turning now to the next partition in partition order, namely partition $102_2$ in the example of FIG. 5. The situation has changed insofar as the set of neighboring already reconstructed/encoded samples used for deriving the predictor for partition $102_2$ may now be composed of samples located outside block 80 and/or samples within block 80, namely ones located in any already processed partition, here currently partition $102_1$ in the example of FIG. 5, as for these samples the prediction residual has already been determined and is already available in data stream 14. That is, encoder and decoder derive the predictor for this partition $102_2$ followed by prediction residual determination in the encoder and prediction residual usage for correction of the predictor in encoder and decoder, respectively. This process is then continued with the next partition in line, i.e., the next partition in partition order, thereby sequentially handling all partitions of block 80.

As has already been mentioned above, it could be possible that the partition order 126 is chosen in another manner than traversing the partition so that immediately consecutive partitions are immediate partition neighbors. That is, the partition order may jump from one partition to the next partition. This implies that the sets $118_i$ of neighboring samples used for deriving the respective predictor by filling the respective partitioning $102_i$ is not restricted to immediate sample neighbors of the respective partition as illustrated in FIG. 5. This also pertains the selection of the start of the partition order 126. Imagine, for instance, partition $102_4$ was the first partition in partition order. Then, its predictor could be derived by filling same depending on a set of neighboring samples $118_4$, not illustrated in FIG. 5, which collects samples located alongside the circumference of block 80 to the left and to the top of block 80. Some of samples in set $118_4$ would not immediately neighbor partition $102_4$. This would, by the way, correspond to the situation of filling the last sample row in the usual intra-prediction filling of block 80 en bloc. The just-mentioned possibility is also true with respect to any subsequently processed partition, i.e., the second and further partitions in partition order. That is, their neighbor sample set $118_i$ may also contain samples not immediately neighboring the respective partition $102_i$. And even further, in case of not restricting the partition order to traverse the partitions in the manner so that consecutive partitions are immediate neighbors of each other, then the set of reference samples $118_i$ of any second or subsequently processed partition $102_i$ may not only collect samples lying to the left and to the top of the respective partition $102_i$, but may also be samples lying below the respective partition $102_1$ depending on whether any partition of block 80 has been processed earlier than partition $102_1$ according to the partition order. That is, set $180_i$ may comprise samples located on more than two sides of partition $102_i$.

Briefly summarizing, FIG. 5 showed the sequential processing of the partitions 102/112 of a block 80 here exemplarily with respect to horizontal partitions, but the same description also applies to the vertical mode 110 with respect to vertical partitions $112_i$. For each partition $102_i$, corresponding prediction residual $102_i$ is contained in data stream 14. Data $120_1$ to $120_4$ together forms the prediction residual for block 80, namely 120. It should be recalled that transform residual coding may, in accordance with an alternative embodiment of the present application, not be used, i.e., the prediction residual 120 of block 80 may be signaled in the data stream 14, for instance, in spatial domain directly. In this case, the data $120_1$ to $120_4$ for the various partitions $102_1$ to $102_4$ may not contain partition separate fields in data stream 14 as illustrated in FIG. 5 where each data portion $120_i$ represents the signaling for a certain transform of the respective partition $102_i$. Rather, the prediction residual 120 for block 80 could, in that case, form one field of data 14. The decoder would, at the time of processing a certain partition $102_i$, collect the information on the prediction residual for this partition $102_i$ from field 120 in this alternative embodiment. This procedure could also be applied when using an exactly reversible version of the transformation so that the quantization may be done in spatial domain.

Thus, FIG. 5 showed that in an encoder and decoder, two tasks are performed for each partition $102_i$, namely: 1) the prediction derivation task 122 yielding the prediction or predictor for the respective partition $102_1$, i.e., a predicted sample value for each sample of the respective partition $102_i$ and 2) the prediction residual related task performed afterwards, namely the prediction residual derivation at the encoder including the quantization of the prediction residual for sake of its entry into data stream 14, and the reconstruction of the samples of the respective partition $102_i$ by combining or correcting the prediction residual and the predictor so as to gain reconstructed samples for this partition $102_i$. The latter reconstructed samples may serve as a reservoir for neighboring sample sets $118_j$ of subsequently processed partitions $102_j$ following in partition order 126 for sake of the prediction derivation task.

Figure 6:
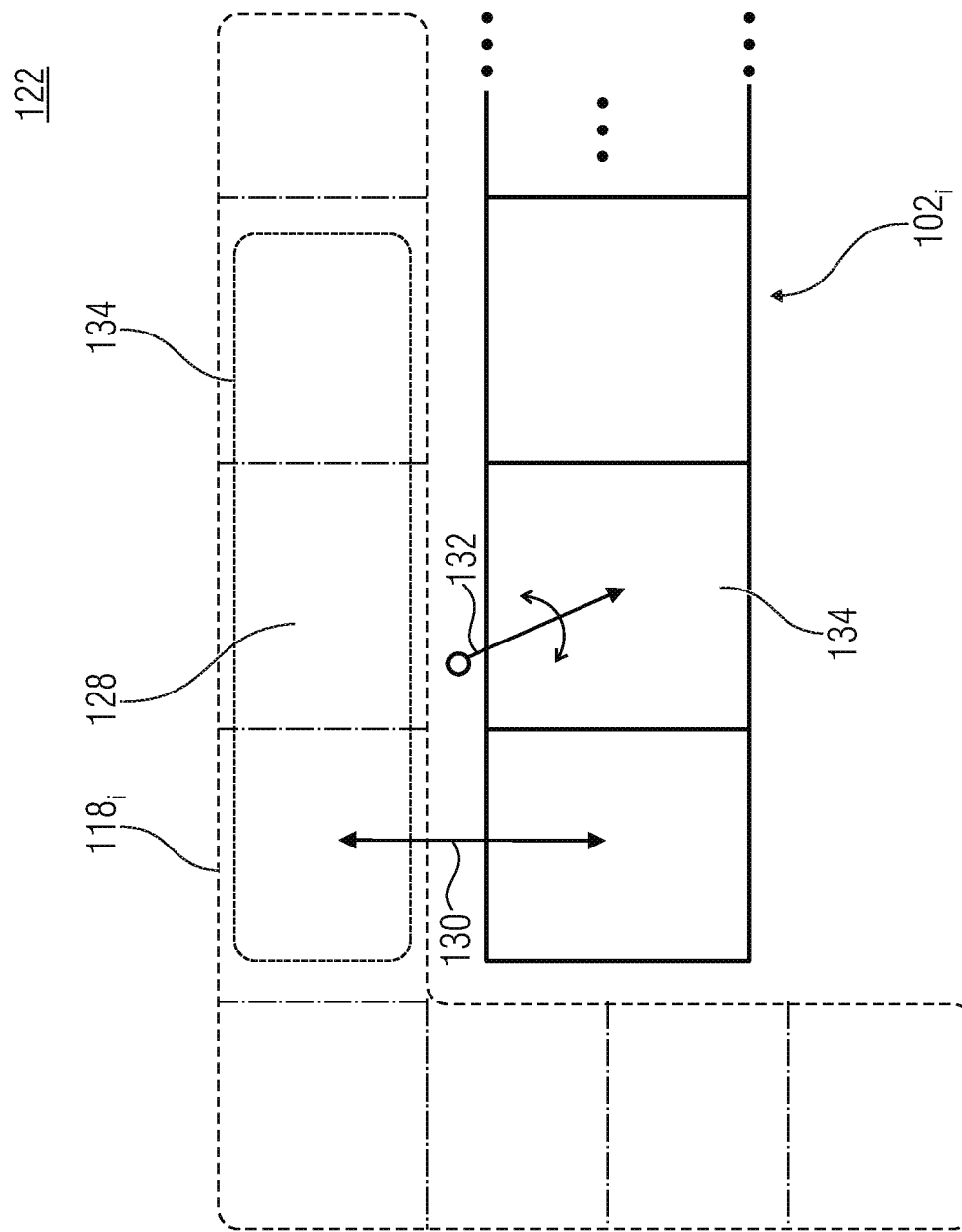
FIG. 6 shows a schematic diagram illustrating the predicted derivation of filling process for a partition.

Before proceeding with the further description of details of embodiments of the present application, FIG. 6 illustrates the process of prediction derivation 122 by filling a currently processed partition $102_i$ wherein it should be recalled that the illustration with respect to a horizontal partition 102 has been chosen merely illustratively and that the same description also relates to vertical partitions 112. FIG. 6 shows the currently processed partition $102_i$ and its corresponding set of neighboring samples $118_i$ already reconstructed/encoded. As already denoted above with respect to FIG. 5, set $118_i$ may not be restricted to samples 128 directly neighboring, or being adjacent to, partition $102_i$. However, due to the partitioning, the mean distance 130 between samples of partition $102_i$ and samples 128 of set $118_i$, when averaged over all samples of block 80, is lower than compared to performing intra-prediction of block 80 as known from, for instance, H.264 or HEVC. As described with respect to FIG. 5, the predictor derivation or filling 122 is performed for each partition $102_i$ using the intra-prediction mode associated with block 80, with this mode indicating one of a set of available intra-prediction modes. This set may comprise angular or directional modes differing from each other in the angle or direction 132 along which the sample content of the neighboring sample set $118_i$ is copied into samples 134 of partition $102_i$. In order to perform this copying, the prediction of each sample 134 of partition $102_i$ may derived on the basis of a number of neighboring samples 134 out of set $118_i$ located relative to the sample 134 in the direction facing opposite to direction 132. The number is, for instance, defined by a kernel of an interpolation filter used to derive inter-pel positions between the samples 128 of sample set $118_i$. FIG. 6 illustrates, for instance, that three samples 128 out of set $118_i$ are used to compute the prediction of one sample 134 out of currently processed partition $102_i$. Owing to the relatively small mean distance 130, the number of reference samples 134 per sample 134 of partition $102_i$ may be kept low. More details will be presented hereinafter. For sake of completeness, however, it should be noted that the set of available intra-prediction modes may also comprise a DC mode according to which one DC value is assigned to all samples 134 of partition $102_i$, with deriving this DC value by performing an averaging on the set of neighboring samples $118_i$. Further, a planar mode may exist according to which the prediction values for samples 134 are defined by a linear function over the sample positions within partition $102_i$ with deriving slope and offsets of this linear function on the basis of the neighboring samples $118_i$. Further, it should be noted that the neighboring set $118_i$ may be different depending on the intra-prediction mode chosen for bock 80 and may be, for instance, particularly different between angular modes and the non-angular modes DC/planar.

For example, in the state-of-the-art JEM decoder, there are 67 intra-prediction modes available: 65 of them are angular modes and two of them, DC and planar, model non-directional textures. The 1D partitioning (briefly called 1D partition mode) mode, i.e., the predictor derivation 122 performed for the partitions 102/112 outlined above and hereinafter, according to which block 80 is partitioned/split into partitions along dimension 104 with the resulting partitions extending over the complete width of the block transversely to dimension 104 with being one sample wide or more than one sample wide along direction 104, can be combined with any of them or, differently speaking, could be implemented using any of them. As already described with respect to FIG. 5, all partitions 102/112 of one block 80, such as a coding unit CU, use the same associated intra-prediction mode of block 80, thereby avoiding an excessive overhead in signalization as the intra-prediction mode 116 needs to be transmitted in the data stream 14 merely once for block 80.

That is, the prediction 122 may be carried out in the same way as in the two-dimensional case outlined in the JEM decoder. However, merely one line, be it horizontal or vertical, is calculated for a currently processed partition 102/112 so that compared to JEM, the prediction process 122 would be adjusted accordingly. In case of choosing the partition order for traversing the partitions in a manner so that consecutive partitions immediately neighbor each other, the prediction process 122 may correspond to the two-dimensional case of JEM, but merely with respect to the first line, i.e., the one being nearest to the already reconstructed/encoded neighborhood. In some cases, both HEVC and JEM allow the usage of certain filters applied on the reference samples 128 or on the resulting predictor. This is useful in the two-dimensional case to better predict samples within the predict block 80 that are far away from the reference samples 128 to reduce boundary discontinuities. However, by using the partitioning into partitions 102/112, it is possible, and it should be the aim, to exploit the high correlations among nearby pixels.

That is, the reduced mean distance 130 should be exploited. Excessive smoothing would reduce this quality. Accordingly, should the encoder or decoder be able to perform both kinds of intra-predictions, namely intra-prediction using partitioning as outlined with respect of FIGS. 4 to 6 and in the following, then intra-filters, i.e., filters involved in the predictor derivation 122, are either disabled or at least the number of contributing samples 134 per partition sample 134 is reduced relative to the number of samples contributing to one sample in the two-dimensional case where the intra-prediction for block 80 is performed on block or performed according to HEVC, namely decomposed into leaf blocks of a hierarchical quadtree subdivisioning of block 80 into rectangular blocks.

As became clear from the discussion brought forward above, in order to perform the prediction residual related tasks 124, the decoder decodes, for instance, a transform of the respective prediction residual of the currently processed partition from the data stream 14, and performs an inverse transform such as a spectral-to-spatial transformation onto this transform in order yield the prediction residual which is then used to correct the predictor obtained at 122 by combination/addition. The same is done in the encoder in order to keep the prediction loop synchronized with the decoder. In addition, the encoder performs the transformation of the prediction error of the predictor determined using 122 for a currently processed partition, subjects same to a transformation such as a spatial-to-spectral transformation, followed by a quantization of the transform coefficients with then coding the transform into the data stream 14 to yield the corresponding data $120_i$ of the currently processed partition $102_i$. As to the transformation, all partitions 102/112 within block 80 may be treated using this same transformation. It may be a DCT-II except in the case of the planar mode, for instance, where the DST-VII may be used. For this reason, all tools related to the transformation and inverse transformation which encoder and decoder may use for other blocks such as transform skipping, i.e., coding in spatial domain, EMT (EMT=Explicit multiple core transform), NSST (NSST=Mode dependent non-separable secondary transforms) or others, may be disabled if block 80 is coded using intra-prediction mode in the partitioning manner outlined so far with respect to FIGS. 4 to 7 and further outlined below, to avoid unnecessary overhead bits. Even alternatively, the transformation may be a linear transform a type of which is selected based on one or more of the intra prediction mode, an dedicated syntax element and the predetermined partition order.

Figure 7:
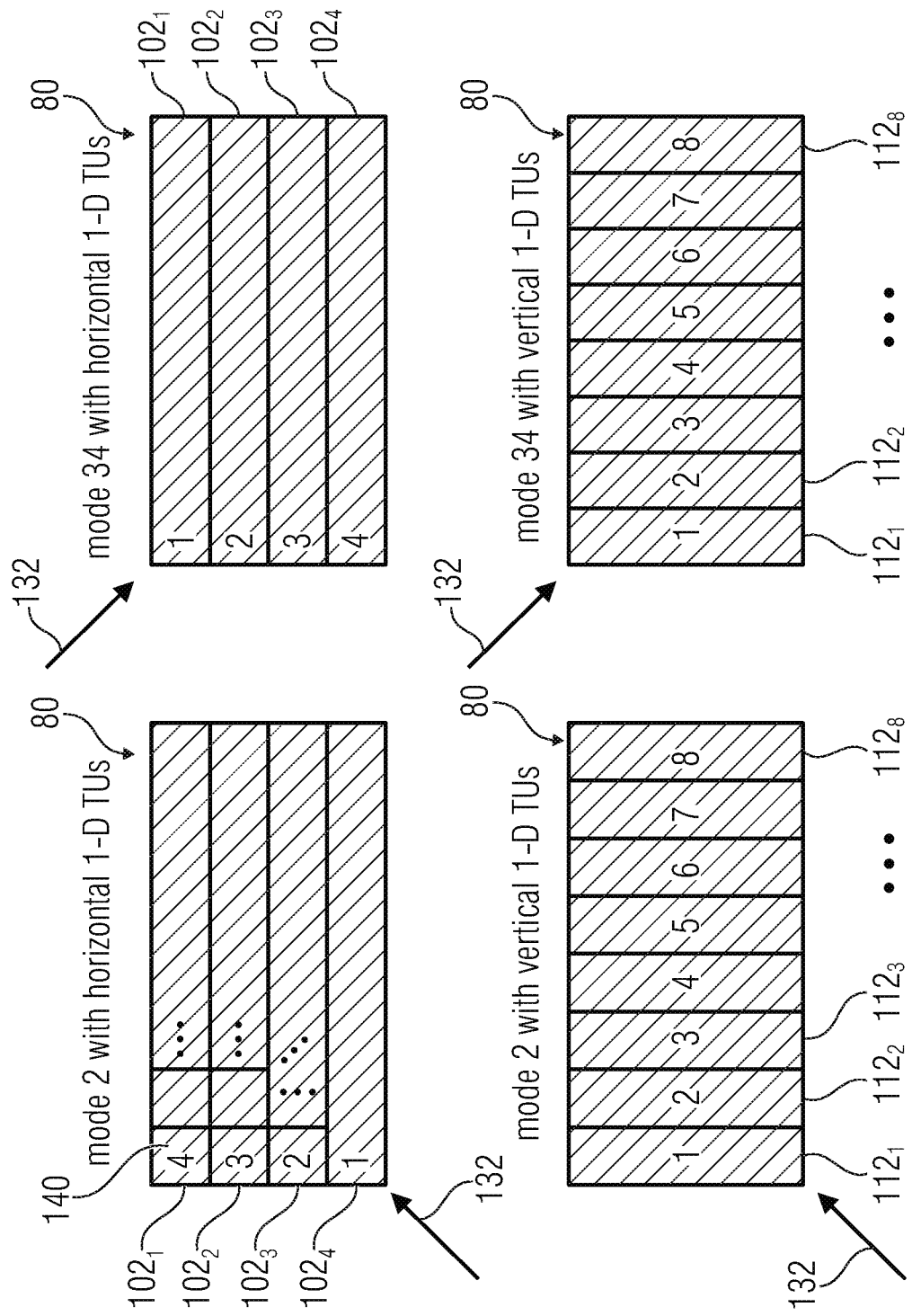
FIG. 7 illustrates examples for partitioned intra-predicted blocks split according to horizontal and vertical split mode, respectively, and having two different intra-prediction modes associated therewith, respectively, in order to illustrate the possibility of rendering dependent determination of the partition order on the intra-prediction mode associated with the intra-predicted block.

Some words have already been spent with respect to the partition order 126 using which the partitions 102/112 of currently processed block 80 are sequentially processed. It should be emphasized that this embodiment is merely an example and that partition order may be static in accordance with alternative embodiments, or may be varied in a different manner in accordance with other embodiments for which examples are set out below. FIG. 7 indicates by inscribed numbering possible partitions/processing orders illustrated in using arrows 126 in FIG. 5. Here, this order follows the inscribed numbers in ascending order. FIG. 5 represented an example, where the order 126 started with a partition containing the top-left pixel/sample 140 of block 80 with leading downward to the lowest partition. Similarly, if the split type were vertical, then the processing order would start with a left most partition containing the top-left pixel/sample again with leading rightwards. However, this is not the optimal case for all existing intra-prediction modes. This is exemplified in FIG. 7 which shows the vertical and horizontal partitioning of a block 80 for the diagonal modes too, i.e., the copy angle/direction 132 points at 45° from lower-left to the upper-right-hand side, and 34, i.e., the copy angle/direction 132 points at −45° from upper-left to lower-right. In the former case, if the split is horizontal, then starting at the top-left corner of the block 80 would produce partitions whose reconstructed samples would not have any influence on the prediction of the following partition. Consequently, it is more reasonable to start at the bottom-left corner of the block, so that the reconstructed samples of each partition can be used to predict the next partition in partition order. In the vertical split, nevertheless, this is not necessary, as it can be observed in the aforementioned figures. On the other hand, mode 34 does not have any of these problems, given that samples come in both horizontal and vertical splits from both sides. Therefore, the normal processing order may be employed in both splits.

Table 1 shows the complete list of processing orders according to the intra-prediction mode and the split type.

TABLE 1

Processing order according to the intra mode and the split type.
HOR_DIR AND VER_DIR are the horizontal and vertical modes respectively and VDIA_DIR is the vertical diagonal mode

| Intra Mode | Split Type | Processing Order |
| --- | --- | --- |
| [0, 1] (Non-Angular) | Horizontal | Normal |
| [0, 1] (Non-Angular) | Vertical | Normal |
| [2, HOR_DIR-1] | Horizontal | Reverse |
| [2, HOR_DIR-1] | Vertical | Normal |
| [HOR_DIR, VER_DIR] | Horizontal | Normal |
| [HOR_DIR, VER_DIR] | Vertical | Normal |
| [VER_DIR+1, VDIA_DIR] | Horizontal | Normal |
| [VER_DIR+1, VDIA_DIR] | Vertical | Reverse |

Figure 8:
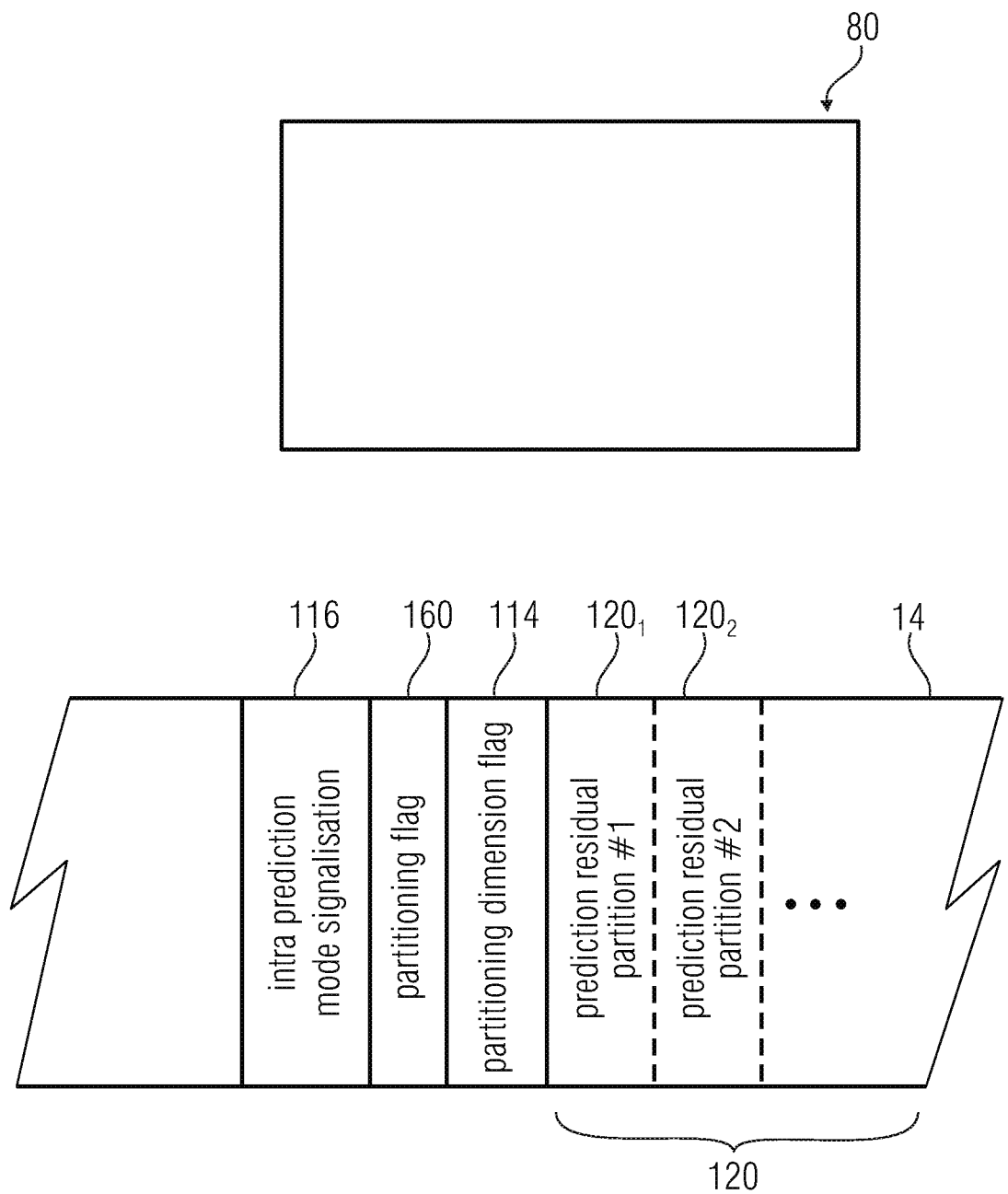
FIG. 8 shows a schematic diagram illustrating a possible signalization spent for an intra-predicted block 80 treated using the partition option.

Summarizing the embodiments described so far with respect to signalization overhead, reference is made to FIG. 8. FIG. 8 illustrates as to what is transmitted for a block 80 in accordance with an embodiment of the present application. In particular, there is the intra-prediction mode signalization 116 signaling as to which intra-prediction mode is to be applied to block 80. Thus, signalization 116 indicates one of the angular modes, for instance, or one of the available modes including the angular modes and non-angular mode(s) such as DC and planar. In addition to this signalization 116, there is a partitioning flag 160 coded by the encoder into data stream 14 and decoded therefrom for block 80 by the decoder, which indicates whether the partitioning treatment according to FIGS. 4 to 7 is applied to block 80, or whether same is treated "normally", such as en block or in one piece or two-dimensionally, i.e., merely samples outside block 80 are used to form the reference sample reservoir 118 to predict each sample within block 80. Alternatively, flag 160 may switch between the partitioning treatment discussed with respect to FIGS. 4 to 7 on the one hand, and the decomposition of block 80 using a quadtree subdivisioning into transform blocks which are then sequentially treated with a disadvantage, however, of having to signal the decomposition in data stream 14. If the partitioning flag 160 indicates the partitioning according to FIG. 4, then data stream 14 contains for block 80 the partitioning dimension flag 114 switching between the partitioning types 100 and 110 discussed with respect to FIG. 4. And then, for each partition of block 80 into which block 80 is subdivided/partitioned if partitioning flag 160 indicates this partitioning option, data stream 14 comprises a signaling/data $120_1$ having the prediction residual of the respective partition encoded there into such as, as indicated above, in transform domain.

With respect to FIG. 8, it should be noted that the prediction residual data $120_1$, $120_2$ . . . may be coded into data stream 14 in an order corresponding to the partition/coding order 126. The latter may, as discussed above, be uniquely determined by the intra-prediction mode indicated by signalization 116. An alternative embodiment, however, would be that the partitioning order 126 is at least partially determined on the basis of an optional additionally signalization in data stream 14.

A further alternative to the description brought forward herein is the fact that signalization 116 may alternatively be used in order to indicate whether the partitioning option is used or not. In other words, one syntax element may commonly assume responsibility for the signalization of 116 and 160. Such a syntax element would assume one out of a range of values each corresponding to a combination of intra-prediction mode and the indication whether block partitioning is used or not. In such a case, I would also be possible to offer the partitioning option merely for a subset of the intra-prediction modes. And lastly, it should be noted that partitioning flag 160 may also be conveyed in data stream 14 conditionally merely in case of the intra-prediction mode indicated by signalization 116 assumes a certain subset out of the available intra-prediction modes.

Figure 9:
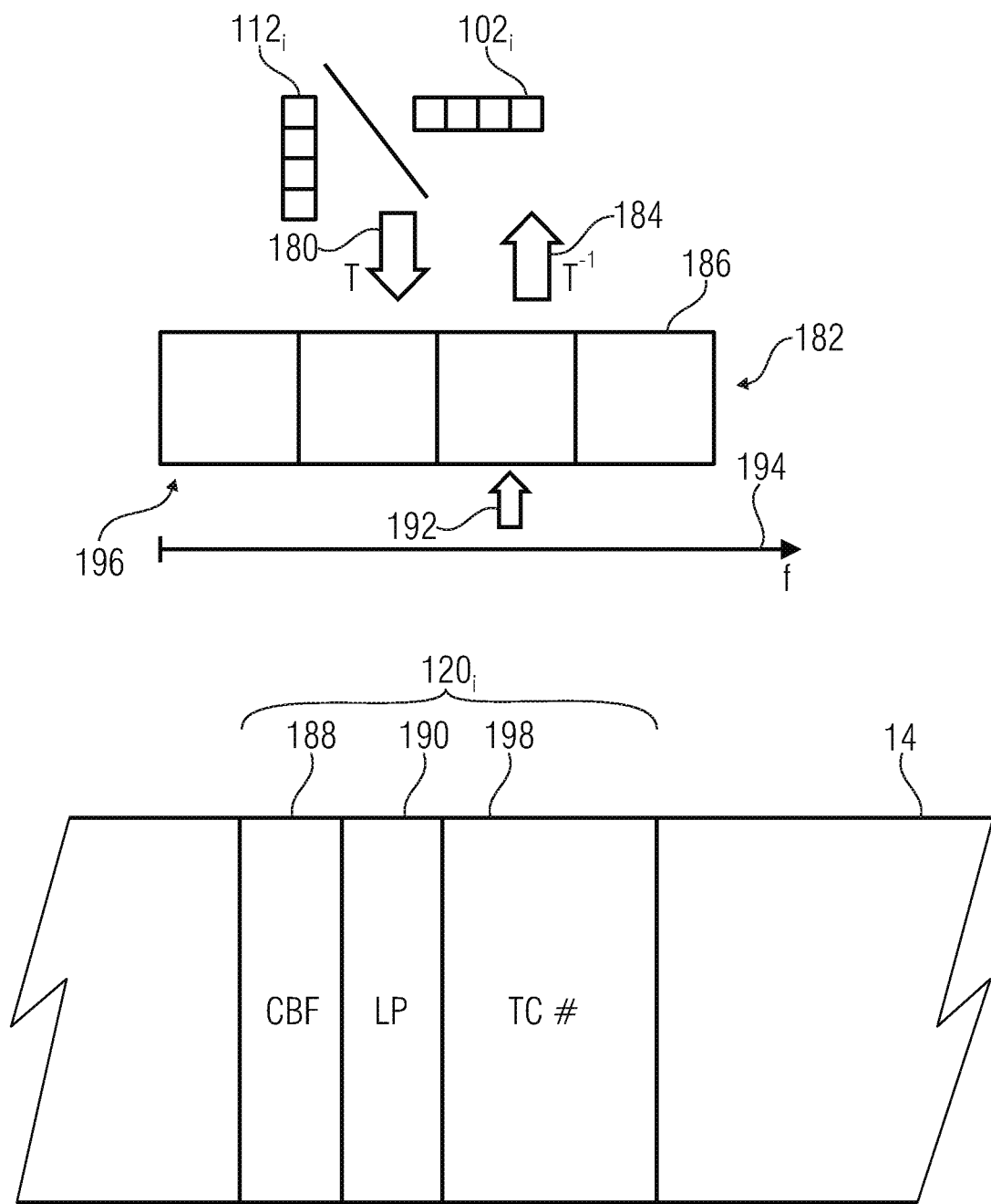
FIG. 9 shows a schematic diagram illustrating a possible way of transmitting the prediction residual of a partition in accordance with an embodiment.

FIG. 9 shows exemplarily as to how the data $120_i$ having the prediction residual of a certain partition $102/112_i$ could look like. According to the embodiment of FIG. 9, the prediction residual is coded into data stream 14 in transform domain. That is, the encoder generates, by way of transformation 180, a transform 182 of the prediction residual, with a decoder deriving the prediction residual and spatial domain by way of inverse transformation 184. FIG. 9 illustrates the transform coefficients 186 of transform 182 corresponding, for instance, to different spectral frequencies f. Data $120_i$ could comprise a coded block flag CBF data $120_i$ could comprise a coded block flag CBF 188 indicating whether transform 182 comprises any significant transform coefficient 186, i.e., whether transform 182 is completely zero or not. If CBF 188 is set, the transform 182 is not zero, and data $120_i$ may comprise a last position (LP) syntax element 190 indicating 192 the last position along increasing spectral frequency (see axis 194) of a significant transform coefficient, i.e., a non-zero transform coefficient 186, starting from the lowest or DC coefficient 196. Then, data $120_i$ comprises signaling 198 signaling the transform coefficients from 196 to 192.

That is, FIG. 9 illustrates that each partition $102_i/112_i$ may have its prediction residual coded into data stream 14 by way of CBF 188, LP 190 and transform coefficient data 198. That is, for a block 80 with n partitions 102/112, there will be n CBFs 188, and one LP 190 for each partition with a non-zero CBF 188, and with the transform coefficient data 198 merely for these partitions having a non-zero CBF 188 associated therewith. The coefficient data 198 may be coded in the same manner as is done for the normally treated intra-predicted blocks, i.e., blocks 80 for which the partitioning flag 160 indicates the non-partitioning option, with the following exceptions: each LP 190 may use only one coordinate if the partition is one-sample wide (otherwise it may use 2 coordinates, as usual), namely x for horizontal splits 100 and y for vertical ones 110. In case of two-dimensional partitions, though, LP 190 indicates the last position along a scan direction or path either using rank indication, or using x and y coordinates. The context of each CBF 188 may be chosen to be the value of previously coded CBF, i.e., the CBF of the previous partition in partition order 126. Further, owing to the partitioning, the transform coefficient data 198 relates to a different shape. That is, the transform 182 has a different shape, too. The transform 182 is a one-dimensional transform in case of the partitions being one-dimensional partitions as discussed with respect to FIG. 4. That is, the transform 182 may be a W/H long vector of transform coefficients 186 depending on the split type 100 or 110.

With respect to the flags 160 and 114 of FIG. 8, and their coding, the following is noted. The flag 160, which indicates whether block 80 is to be divided into partitions 102/112, defines the condition to be checked whether flag 114 is conveyed in data stream 14 for block 80. In particular, if flag 160 indicates the partitioning into partitions 102/112, flag 114 is present in data stream 14 and sent to the decoder in order to signal as to which type of split 100/110 is to be performed, i.e., either horizontal or vertical. Just as the flag CBF, also flag 114 may be coded using context-dependent entropy coding/decoding. The context of flag 114 may have three possibilities according to the intra-prediction modes of block 80: 0 for non-angular modes, 1 for horizontal modes and 2 for vertical modes.

While FIG. 9 illustrated that that a CBF 188 might be present once per partition i of the current block 80, additionally or alternatively, the transform 182 of the partitions $120i$ of the current block might each be portioned into one or more sub-blocks with a coded sub-block flag signaled per sub-block within data $120i$ indicating whether the transform coefficients 186 within that sub-block are all zero or at least one coefficient thereof is non-zero. Thus, only coefficients 186 within sub-blocks for which the coded sub-block flag signals the presence of non-zero coefficients, would be coded, The other coefficients within sub-blocks for which the coded sub-block flag signals the absence of any non-zero coefficients, would be inferred to be zero at decoder side. Note that as each partition $120i$ is transformed separately, sub-blocks belonging to one partition differ in spectral components of the transform 182 of that partition and differ in the transform coefficients 186 they comprise out of that transform. For example, sub-blocks can be set in such a way that they are 4×4 coefficient blocks as long as the respective partition $102_i/112_i$ has dimensions in x (partition width) and y (partition height) which are both equal to or larger than 4 samples 140, and consequently as long as the transform 180 of the respective partition $102_i/112_i$ has dimensions in x and y which are both equal to or larger than 4 coefficients 186. In case of a 4×N partition, the sub-blocks form a column of m 4×4 sub-blocks with m*4=N and m being an integer. In case of a N×4 partition, the sub-blocks form a row of m 4×4 sub-blocks with m*4=N and m being an integer. For broader partitions, an array of 4×4 sub-blocks, arranged in rows and columns, could result. Depending on the embedment it might be, however, that such partitions, i.e. broader than 4 samples and/or as broad as 4 samples, do not occur. Irrespective of the occurrence or not, for partitions being narrower, i.e. for which one of its dimensions is less than 4 samples, i.e. which are less then 4 sample wide in at least one dimension x or y, the sub-block partitioning of its transform 180 into sub-blocks each which gathering different groups of coefficients of that transform 180 may be done so that the sub-blocks have a minimum number M of coefficients in all possible cases for the current block's size. That is, the partitions might be set to be as large as the block width N along one dimension, with the partitioning taking place along the other dimension 104. The transform 180 of each partition may, thus, be of size 1×N, 2×N, N×1 or N×2. In fact, the transform 180 of a certain partition may have a number of coefficients equaling the number of samples in this partition. In case of a 1×N partition/transform, the sub-blocks may then form a column of m 1×M sub-blocks with m*M=N and m being an integer. In case of a N×1 partition, the sub-blocks form a row of m M×1 sub-blocks with m*M=N and m being an integer. In case of a 2×N partition/transform, the sub-blocks may then form a column of m 2×(M/2) sub-blocks with m*(M/2)=N and m being an integer. In case of a N×2 partition, the sub-blocks may form a row of m (M/2)×2 sub-blocks with m*(M/2)=N and m being an integer. This is exemplarily shown in Table 1 for the exemplary case of M=16 for the minimum number of coefficients.

TABLE 1

Entropy coding coefficient group sizes

| Block (partition/transform) Size | Coefficient group (sub-block) Size |
|---|---|
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| All other possible M × N cases | 4 × 4 |

While FIG. 9 illustrated that that a CBF 188 might be present once per partition i of the current block 80, it might be agreed between decoder and encoder that at least one of the n partitions among the partitions for a current block 80 has a non-zero CBF 188. For this reason, if n is the number of sub-partitions and the first n−1 sub-partitions in coding order have produced a zero CBF, then the CBF of the n-th partition will be inferred to be 1. Therefore, it is not necessary to decode it and it is not encoded. Thus, the CBF of data $120n$ would be missing is the CBF in data $120_1$ to $120_{n-1}$ signalled zeroness and the decoder would infer this CBF to signal that at least one non-zero coefficient is present in the transform of that partition.

As far as the intra-coding mode signalization 116 is concerned, the following may hold true. It might be the coding mode signalization 116 is sent as a pointer or index which points to one out of a list of most probable modes (MPM). The latter MPM list, in turn, might be determined by encoder and encoder in the same manner based on intra prediction modes used for previously coded/decoded intra-predicted blocks such as spatially and/or temporally neighboring intra prediction modes. Thus, the MPM list may represent a proper subset of available/supported intra-prediction modes, namely the afore-mentioned angular modes and/or one or more of DC and planar modes. As mentioned above, it might be that there are intra-predicted blocks using the LIP or ISP scheme such as block 80 in the figures, besides ones which are intra-predicted classically, i.e. en block or in units of transform blocks into which such intra-predicted blocks are partitioned using recursive quadtree partitioning. Both types of intra-predicted blocks might support the same set of available/supported intra-prediction modes. While for the later normal/classical intra-predicted blocks, a MPM flag may be signaled in the data stream—with the decoder decoding same and the encoder encoding same—indicating whether the mode of that block is selected out of the MPM list, in which case a pointer/index into this MPM list is transmitted—with the decoder decoding same and the encoder encoding same—the MPM flag would be inferred to signal the MPM list restriction in case of intra-predicted blocks using the LIP or ISP scheme such as block 80. If, for a certain normal/classical intra-predicted block the MPM flag signals that none of the MPM modes is used, no index/pointer is present for that block in the data stream and a substitute pointer/index into a remainder list of intra-prediction modes is transmitted in the data stream for that block instead. The remainder list may also be a proper subset of the set of available/supported intra-prediction modes, and may, in particular, be the complementary set of the MPM list compared to the set of available/supported intra-prediction modes, i.e. every member of the set of available/supported intra-prediction modes would either be member of the MPM list or the remainder set. The pointer/index into the MPM list might be VLC coded, while the pointer/index into the remainder set might be coded using a fixed-length code. Naturally, it might be that even for intra-predicted blocks of the LIP or ISP scheme, the MPM flag is transmitted and that the encoder would be free to select any mode out of the set of available/supported intra-prediction modes with setting the MPM flag depending on whether the selected mode is thin the MPM list or the remainder set.

The MPM list might be the same, i.e. might be determined in the same manner by encoder and encoder, for the normal/classical intra-predicted blocks as well as for the ISP/LIP intra-predicted blocks. However, irrespective of whether restriction to the MPM list and inference of the MPM flag to signal MPM list usage for ISP/LIP intra-predicted blocks applying or not, alternatively, the MPM list may be determined differently for ISP/LIP intra-predicted blocks in order to adapt to the statistics of the ISP/LIP mode. For example, it could be altered to exclude the DC intra mode from the MP list and to prioritize horizontal intra modes for the ISP horizontal split, i.e. horizontal direction 104, and vertical intra modes for the vertical one, i.e. vertical direction 104. That is, for a normal/classical intra-predicted block, the MPM list could form a proper subset of the set of available/supported intra-prediction modes, the modes being selected and ordered in accordance with a certain concept. For ISP/LIP intra-predicted blocks 80, the MPM index could point to an MPM list which depends on the partitioning direction 104 signaled by flag 114 and/or which forms a proper subset of set of available/supported intra-prediction modes less the DC mode or less the DC and planar modes, i.e. a proper subset of the angular modes in the set of available/supported intra-prediction modes. The MPM list construction based on previously used intra-prediction modes of previously coded/decoded could use angular modes of an angular intra prediction direction being closer to the horizontal dimension in case of the flag 114 indicating the partitioning direction 104 to be horizontal and use angular modes of an angular intra prediction direction being closer to the vertical dimension in case of the flag 114 indicating the partitioning direction 104 to be vertical.

With respect to the description just brought forward, it is again noted that the juxtaposition between intra-prediction modes normally treated and intra-prediction modes treated using partitioning as outlined herein, needs not to be. That is, encoder and decoder may treat intra-predicted block 80 inevitably using the partitioning presented herein with then, accordingly the partitioning flag 160, for instance, becoming obsolete. If, however, the partitioning option signaled by flag 160 is available as one decision for the encoder, then the following description reveals a possibility as to how the encoder performs the decision, or finds out, whether the partition mode should be used for a certain block 80 and which split type, namely horizontal or vertical, is the best one. In order to perform this, the encoder should test both options for different intra-prediction modes for each block. Compared to the case where the encoder would merely have one option such as the normal option, the encoder will, thus, be slower since more options have to be tested. In order to reduce this impact, the partition mode signaled by flag 160 may be tested by the encoded according to the following strategy, wherein reference is made to FIGS. 10 and 11.

Figure 10:
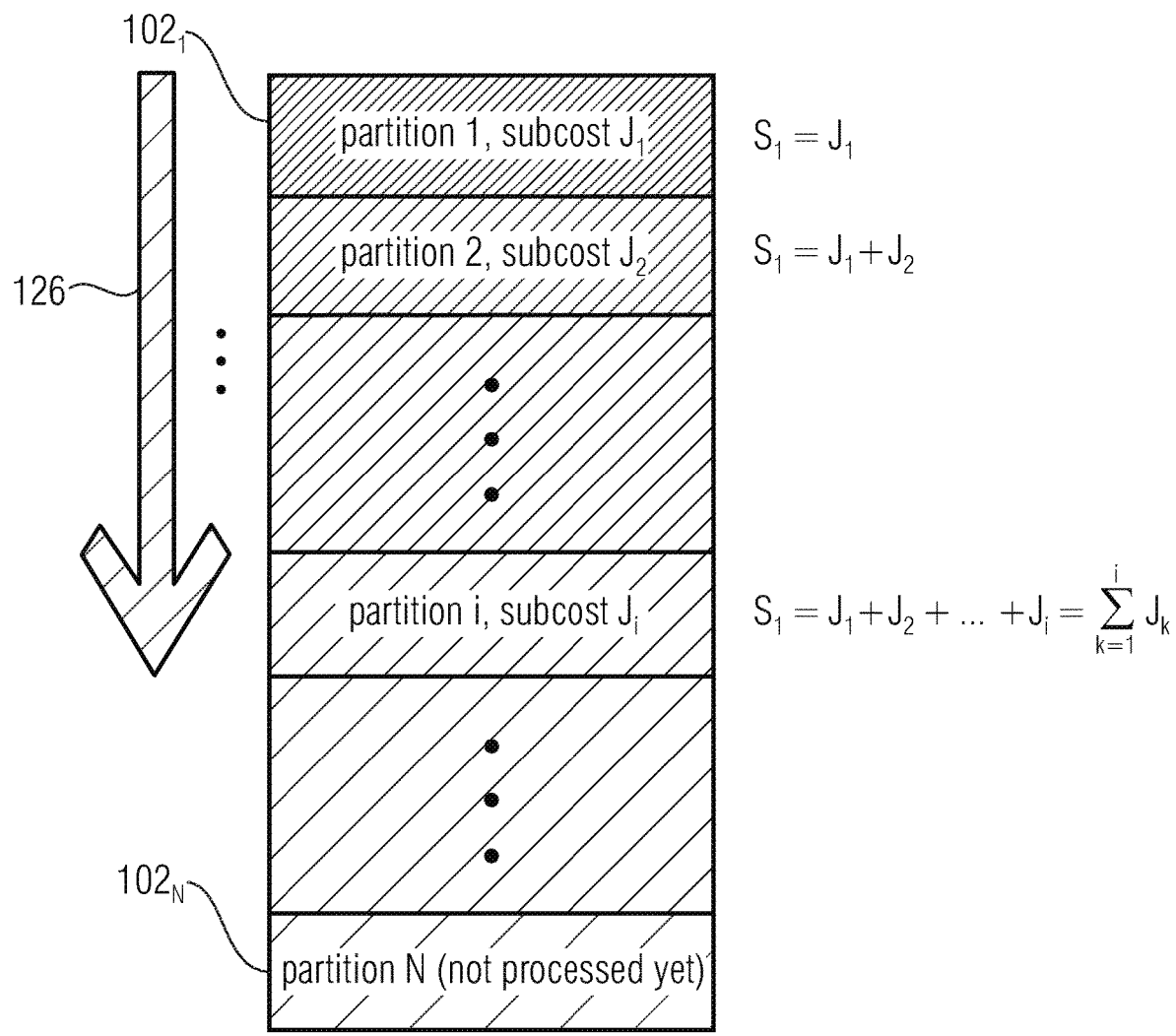
FIG. 10 shows a schematic diagram illustrating the partial sum determination for coding costs involved with the partitioning of intra-prediction mode in order to be able to abort the test when it is clear that same will not become better than any of the normal intra-prediction modes.
Figure 11:
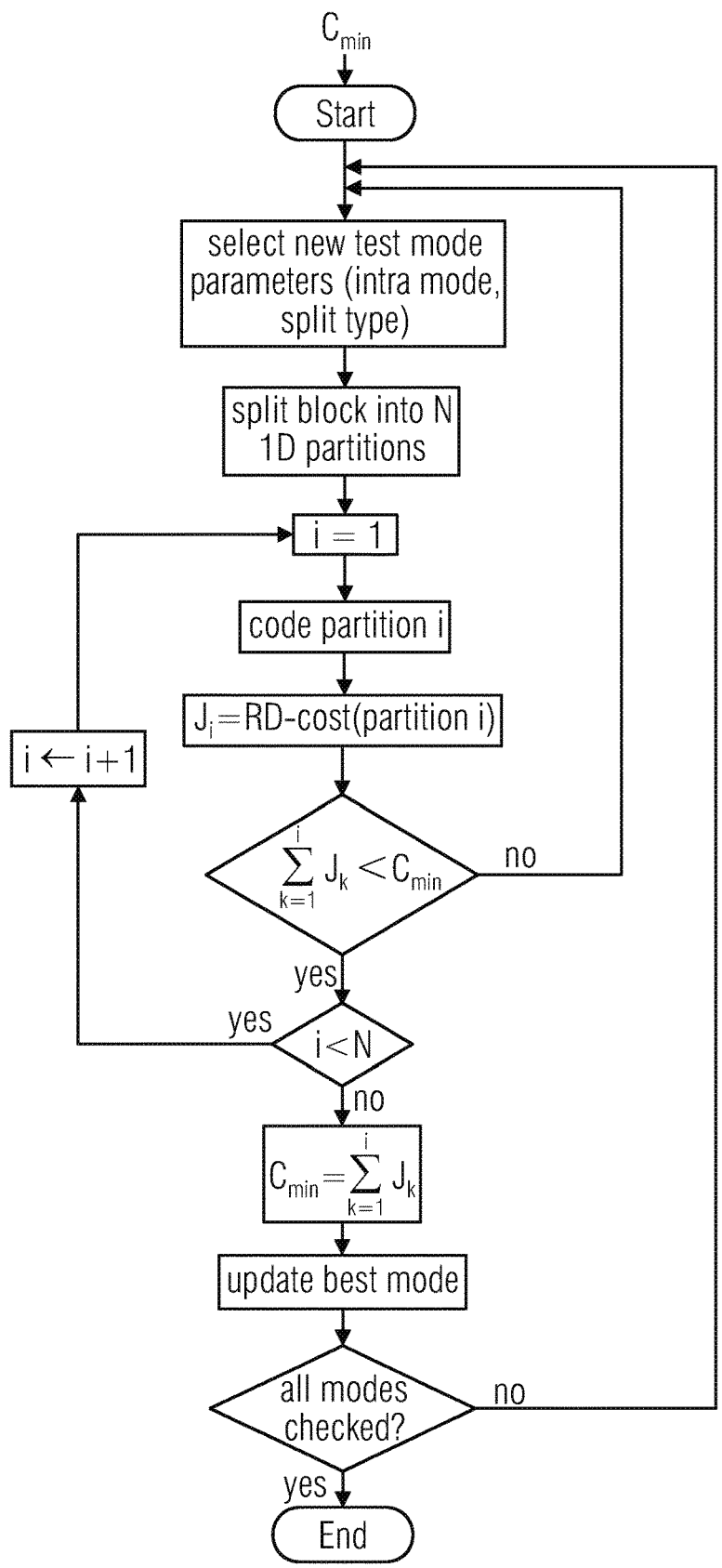
FIG. 11 shows a flowchart of a mode or operation of the encoder in order to perform the partition mode testing in accordance with an embodiment.

1) The 1D partitions mode is the last intra mode to be tested.
2) Let $C_{min}$ be the minimal cost so far at the moment when the 1D partitions mode is going to be tested.
3) Select a combination of intra mode and split type to be tested.
4) The block is split into N 1D partitions and let i denote the index of each of these partitions, where i=[1,N].
5) After every partition is coded, its subcost $J_i$ is calculated. Therefore, we can know the sum of all the subcosts that are available after the partition i has been coded, which is $S_i = \sum_{k=1}^{i} J_k$. This procedure is depicted in FIG. 10 which, thus, illustrates the accumulation of the 1D partitions subcosts to obtain the final cost of the whole block.
6) After every partition is processed, the expression $S_i < C_{min}$ is evaluated. If it is true, we continue coding partitions till the end. Otherwise, it is guaranteed that this test mode is not going to yield a lower RD cost than $C_{min}$, so the process is interrupted and we move on to the next combination of intra mode and split type.
7) If all 1D partitions are coded, then the test mode is the best mode and $C_{min}$ is updated accordingly.

The advantage of this procedure is that it avoids processing 1D partitions that are not necessary, since it can be already known that the 1D partitions mode is not going to yield a better cost than the already existing minimal cost. Besides, it does not have any drawbacks in terms of RD loss. The whole process is illustrated as a flow chart in FIG. 11.

It is noted again that all of the above embodiments illustrating the partitioning as being made in one sample wide stripes transverse to direction 104, the partitioning may alternatively be made in a manner leading to partitions being wider, thereby leading to two-dimensional partitions, unless certain specifics in the embodiment's description exploit the one-dimensionality. Further alternatives with respect to the partitioning are set out below.

In other words, in the above description embodiments have been described which may briefly described as including a Line-based Intra Prediction (LIP) coding mode tool according to which an intra-predicted W×H block 80 is divided in 1-D partitions 102/112 or lines. Then, each of the resulting lines 102/112 were predicted and a residual signal was generated, which is transformed, quantized and entropy-coded and finally the coefficients were described to be sent to the decoder. The reconstructed samples of such a line can be used to predict the next line, etc. This process is repeated until all 1-D partitions within the original block are coded.

However, modification are feasible relative to this LIP concept. It had already been indicated above when discussing FIG. 4, that embodiments of the present application are not restricted to have the partitions 102/112 one sample wide along partitioning/splitting direction 104. In the embodiments described next, the width along splitting direction 104 is defined based on 1) whether the intra-prediction mode is an angular or non-angular mode, and 2) the width of the intra-predicted block along that direction 104.

1) A W×H (where it is assumed W and H are powers of 2) block 80 can be divided horizontally or vertically (indicated, for instance, with a syntax element 114 that is sent to the decoder) into K equal partitions 102/112 with w×h dimensions, whose values are described in Table II. According to Table II, a block with W=16, H=8 predicted using a non-angular intra mode and subject to a vertical split (i.e. with direction 104 being vertical), for instance, would be split into 4 partitions 102 all of which would have dimensions w=16 and h=2. This example is depicted in FIG. 12a. If the same bock 80 was predicted using an angular intra mode, it would be split into 8 partitions 102 each of which had dimensions w=16 and h=1.

TABLE II

Values of w, h and K for the extra layout example 1

| Variable | Intra Mode | Ver. split | Hor. Split |
|---|---|---|---|
| w | Angular | max(W/8, 1) | W |
|  | Non-angular | W/4 | W |
| h | Angular | H | max(H/8, 1) |
|  | Non-angular | H | H/4 |
| K | Angular | H/h | W/w |
|  | Non-angular | H/h | W/w |

2) A W×H (where it is assumed W and H are powers of 2) block 80 can alternatively be divided horizontally or vertically (indicated, for instance, with a syntax element 114 that is sent to the decoder) into K equal partitions with w×h dimensions, where the value of K is not fixed (and therefore it is transmitted to the decoder with a syntax element) and its range can be any power of 2 between 2 and S, where S is value of the dimension that is being split (width for the vertical split and height for the horizontal one). The values of w and h are obtained as described in Table III.

TABLE III

Values of w and h for the extra layout example 2

| Variable | Ver. split | Hor. split |
|---|---|---|
| w | W/K | W |
| h | H | H/K |

Instead, the width of the partitions along the dimension 104 could be signaled for block 80 directly.

3) A W×H (where it is assumed W and H are powers of 2) block 80 can alternatively be divided horizontally or vertically (indicated, for instance, with a syntax element 114 that is sent to the decoder) into K partitions (where K depends on W and H) with $w_i \times h_i$ dimensions with i=1, 2, . . . , K. Let S=H, $s_i=h_i$ if the split is horizontal and S=W, $s_i=w_i$ if it is vertical). Various options of values of $s_i$ are described in Table IV for different values of S which measures the width of block 80 along dimension 104 and $s_i$ measures the width of partition i along dimension 104.

TABLE IV

Values of $s_i$ for different partition layouts

| Examples of values of S | $s_i$ (Op. 1) | $s_i$ (Op. 2) | $s_i$ (Op. 3) |
|---|---|---|---|
| 4 | (1, 1, 1, 1) | (1, 3) | (1, 1, 1, 1) |
| 8 | (1, 2, 2, 2, 1) | (3, 5) | (2, 2, 2, 2) |
| 16 | (2, 4, 4, 4, 2) | (5, 7, 4) | (2, 4, 4, 4, 2) |
| 32 | (4, 8, 8, 8, 4) | (7, 9, 11, 5) | (2, 4, 8, 4, 8, 4, 2) |
| 64 | (8, 16, 16, 16, 8) | (11, 13, 15, 17, 8) | (2, 4, 8, 16, 4, 16, 8, 4, 2) |
| 128 | (16, 32, 32, 32, 16) | (17, 19, 21, 23, 25, 23) | (2, 4, 8, 16, 32, 4, 32, 16, 8, 4, 2) |

The option that is used by the decoder is fixed or it can be determined implicitly according to the value of existing parameters at the decoder side.

4) A W×H (where it is assumed W and H are powers of 2) block 80 can alternatively be divided horizontally or vertically (indicated, for instance, with a syntax element 114 that is sent to the decoder) into K partitions (where K depends on W and H) with $w_i \times h_i$ dimensions with i=1, 2, . . . , K. Let S=H, $s_i=h_i$ if the split is horizontal and S=W, $s_i=w_i$ if it is vertical). The value of $s_i$ will be determined through a syntax element that indicates which of the three options presented in Example 3) is to be used to divide the block into sub-partitions.

Thus, as exemplified in above examples 1 to 4, he partitioning may be done along one dimension 104 so that the partitions are as wide as the predetermined block perpendicular to predetermined dimension, while a width of the partitions, measured along the predetermined dimension 104, is selected out of at least two different width settings or options. Explicit or implicit signaling concepts may be used to keep the selection synchronous between encoder and decoder. The selection, thus, enables that, while partitioning may be varied between blocks of the same size and shape, the overhead associated with this variation is kept reasonably low. The selection may, for instance, be done depending on the intra-coding mode for the predetermined block such as depending on whether the intra-coding mode for the predetermined block is an angular mode or not. The selection may also be made depending on an index in the data stream for the predetermined block indexing on of the at least two different width settings as shown in example No. 4. The partitions may be one or more samples wide along the partitioning dimension. Within one block, the partitions width along the partitioning/predetermined direction may vary. One may be one sample wide, i.e. is one-dimensional stripe, while another is more than one sample wide, is a two-dimensional field of samples.

Further, in case of some of the LIP concept embodiments presented above, two types of processing order—called partition order 126 in the above description—were proposed to be available for each block 80 with the one finally applied being chosen depending on the intra mode used for block 80. As already stated above, however, there exist alternatives for deciding on the partition order 126. The processing order 126 indicates in which order the sub-partitions 102/112 are to be processed. A possible processing order 126 consists of starting at the top-left sub-partition and then continuing in a predetermined order such as downwards in case of horizontal splits or rightwards in case of vertical splits or any other order such as raster scan fashion in case another partitioning into partitions would be used. In general, the processing order 126 could be determined by existing parameters available at the decoder side at the time a respective sub-partition is going to be decoded/processed. That is, for the decoder, the processing order 126 could be something which is determined on the fly, i.e. alternatingly with predicting the various sub-partitions 102/112. Such existing parameters may include the intra mode, the sub-partition index, the dimensions of the original block, the dimensions of the sub-partition, the current partition's CBF flag etc. The order 126 could also be directly signaled to the decoder.

The motivation, to vary the partition order even for blocks 80 subject to partitioned intra-prediction using the same partitioning into partitions 102/112 may stem from thoughts already discussed above with respect to FIG. 5: changing the order 126 at which partitions 102/112 are processed enables to distribute the prediction accuracy among the various partitions 102/112. For instance, as exemplified above, when choosing a partition 102/112 located farther away from the neighbor sample set 118 to be processed first according to partition order 126 this will mean that its intra-prediction will be worse than it would be if that partition would be processed last according to partition order 126 as in the latter case the reference used for filling that partition would be located nearer, namely at the partition abutting that partition at its side facing the reference sample set 118. In case of FIG. 5, for instance, it is clear that the intra-prediction result obtained for partition $102_4$ will cause a larger prediction residual in case of being first in accordance with partition order 126 (so that the prediction would be obtained based on neighboring samples outside block 80), compared to the case where partition $102_4$ is processed last according to partition order 126 (in which case partition $102_4$ would yield a prediction based on a neighbor sample set covering immediately neighboring samples relative to partition $102_4$ and comprising, for instance, samples of partition $102_3$). However, the opposite is true with respect to the remaining partitions. In case of processing partition $102_4$ first, the reconstruction thereof using the prediction residual for partition $102_4$ may be included into the neighbor sample sets $118_i$ of any subsequently processed partition according to partition order 126, thereby enabling, for instance, predicting the inner of each partitions $102_1$ to $102_3$ of FIG. 5 using the intra-prediction mode for block 80 from both sides of these partitions. In case of processing partition $102_4$, the neighbor sample set $118_i$ is merely located at one side of the respective partition for each of partitions $102_i$ with i=1 . . . 4. That is, with respect to partitions $102_1$ to $102_3$, the circumstances would opposite. For these partitions, the prediction residual would be lower in case of processing partition $102_4$ first compared to processing partition $102_4$ last. And even further, it should be considered what has also been already indicated above, namely the fact that the order may not only be switched between two options of consecutively traversing partitions side by side, but that there is also the possibility to allow even further partition orders 126 such as processing every second partition in accordance with a predetermined order first with then processing the remaining partitions in the same order or in the opposite predetermined order. Which option is best may either be determined by testing the various order options on the encoder side with transmitting a respective additional signalization on the order 126 for block 80 in the data stream, or the order 126 may be selected at encoder side and decoder side in the same manner depending on syntax elements transmitted in the data stream for block 80 or for neighboring blocks in a manner so that even for blocks 80 of the same size and shape and being partitioned the same way into partitions 102/112, the order 126 is not equal but vary among these blocks 80.

Thus, the partition order at which the partitions of block 80 are processed, may be selected out of at least two different orders. Explicit or implicit signaling concepts may be used to keep the selection synchronous between encoder and decoder. The selection, thus, enables that, while on partition order applies to the predetermined block, another order may apply to another block, also coded using the partitioned intra-prediction concept, being of the same size and shape and being partitioned into partitions the same way. A freedom in choosing the partition processing order for the encoder, or rendering dependent the partition processing order on other parameters than size, shape and partitioning, is effective in increasing the effectiveness of the partitioned intra-prediction mode. The effectiveness may even be larger when recruiting, for the derivation of the predictor of a certain partition $102_i$, the reference samples $118_i$ in a manner depending on the selection of the predetermined partition order 126 for the predetermined block out of at least two different orders. IN particular, as shown, recruited reference samples $118_i$ may be located at two opposite sides of the current partition in case of one available or selectable partition order while same may be located merely on one of the two opposite sides of the partition $120_i$ in case of a another selectable partition order. In case of partitioning along dimension 104, the "sides" may by the sides of partition $120_i$ facing along that direction such as the upper and lower side in case of vertical direction 104, and left and right sides in case of horizontal direction, but in case of another partitioning as they are also briefly discussed hereinbelow, the "sides" may be simply defined as one side of the partitioning facing those samples out of the reference sample set $118_i$ which are located outside block 80, and one side of the partitioning facing those samples out of the reference sample set $118_i$ which are located inside block 80, namely within one of the previously processed partitions. For example, while one of the at least two different selectable orders may traverse the partitions starting from a partition farthest away from an upper left corner of the predetermined block, another of the at least two different selectable orders may traverse the partitions starting from a partition nearest to an upper left corner of the predetermined block.

Another issue which shall be addressed pertains the residual coding. Same may, as described above, be done using transform coding. Each sub-partition 102/112 may have in the data stream its own Coded Block Flag (CBF) 188, Last Position (LP) syntax element 190 and transform coefficients 198, which will be transmitted to the decoder. Therefore, for a block 80 such as a CU, with K sub-partitions 102/112, there will be K CBFs 188 and one LP 190 for each partition 102/112 with a non-zero CBF. The context used to code each CBF 188 may depend on the value of the CBF of a previously coded sub-partition within the same block—along order 126, for instance. Additionally, a further not yet mentioned syntax element might be transmitted to the decoder in the data stream to indicate whether the described concept is used or not on every block, or to indicate whether at a scope corresponding to the whole data stream or a certain picture or for a slice of a certain picture, for instance, the partitioned intra-prediction concept described herein is used or not on every intra-predicted block 80 within that scope or whether some are signaled to be treated as one piece, i.e. like being partitioned into only one partition.

Likewise, at has been described above that each sub-partition might be transformed separately using one transform, thereby yielding one transform for each partition 102/112 not quantized to all zero. As the transform for a certain partition 102/112, a 2-D transform may be used, except in the case that one of the dimensions of that partition 102/112 is one, in which case a 1-D transform will be applied. The transform core can be a DCT-II or any other transform determined by existing parameters at the decoder side at the time the sub-partition is going to be decoded. For example, the transform could be selected according to the combination of the intra mode, the sub-partition index and the sub-partition dimensions or some subset of the latter parameters. It could also be directly signaled to the decoder or, differently speaking, in form of an extra syntax element sent, for instance, for all partitions within block 80 or for each partition 102/112 of one block 80 separately.

One aspect pertains the aspect also already discussed above is the fact that the residuals of partitions 102/112 of block 80 may be, after quantization in spatial or some intermediate transform domain reached by subjecting the prediction residual of each partition partition-individually to a transform the transform coefficients of which are then quantized, be subject to a further transform which is lossless or reversible, though. The decoder would, thus, be able to obtain the transform coefficient levels of a transform for the whole block 80, subject same to the inverse lossless transform to obtain the prediction residuals for each partition 102/112 in spatial domain or intermediate transform domain from the prediction residual in spatial domain is obtained by re-transformation for each partition 102/112.

Figure 12B:
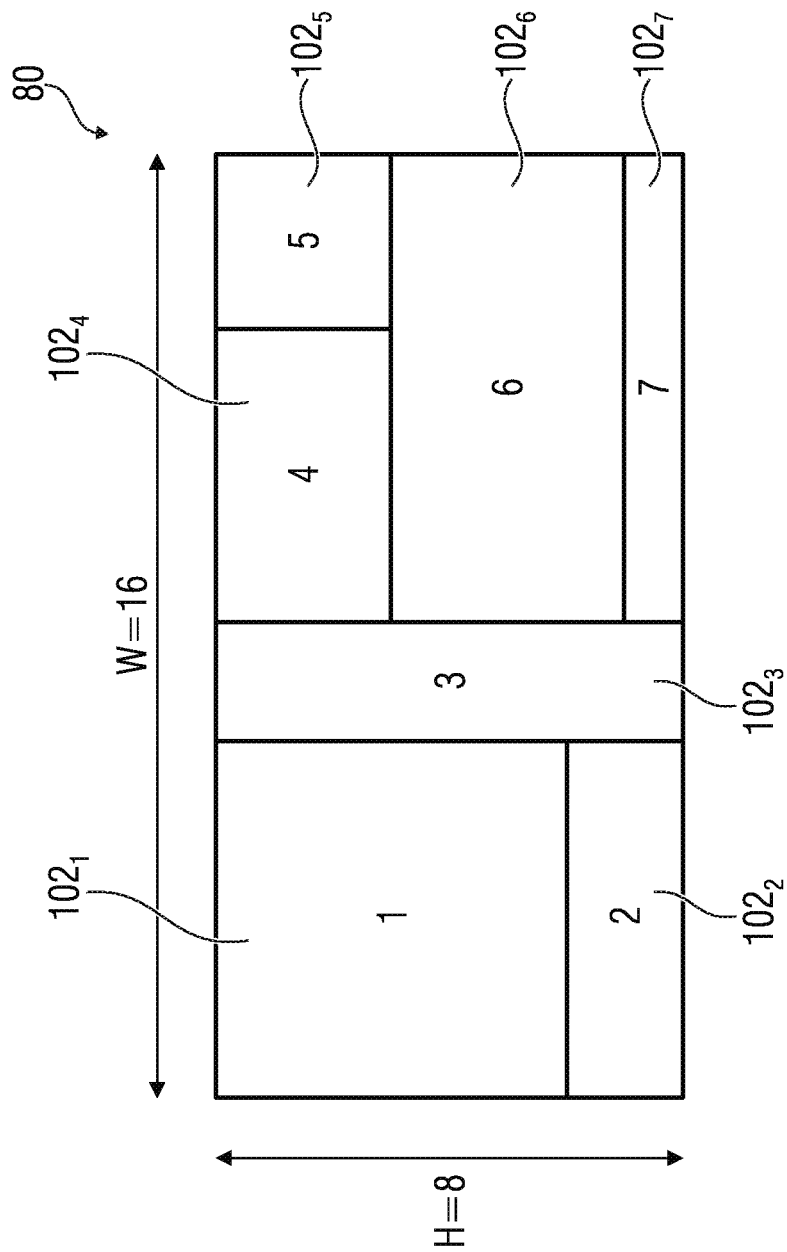
FIG. 12 a and b show examples for an alternative partitioning of an intra-coded block, FIG. 12a as a further embodiment and FIG. 12b as an illustrative comparison embodiment.

It should be noted that, according to a variation of the above described embodiments, the partitioning could be done differently than in form of a partitioning along a dimension 104. Intra-predictive coding using such a variation could be given a name, such as Flexible Intra Prediction Sub-partitioning (FIPS). Instead of a partitioning into stripes 102/112, the division/partitioning of block 80 could result into any rectangular sub-partitions of block 80. The Flexible Intra Prediction Sub-partitioning (FIPS) would divide a W×H intra-predicted block 80 into K rectangular non-overlapped sub-partitions of sizes $w_i \times h_i$, where i=1, 2, . . . , K. The resulting layout of the sub-partitions perfectly compact, which implies that the sum of the areas of the sub-partitions is equal to the area of the original block, i.e., $\Sigma_{i=1}^{K} w_i h_i = WH$. FIG. 12b shows an example of such a generalized division of block 80 where reference sign 102 has been re-used for the partitions. In this case, a 16×8 block 80 is divided into K=7 sub-partitions 102, whose dimensions are defined in Table V.

TABLE V

Dimensions of the sub-partitions depicted in FIG. 12b

| Sub-partition Index | Width | Height |
|---|---|---|
| 1 | 6 | 6 |
| 2 | 6 | 2 |
| 3 | 2 | 8 |
| 4 | 5 | 3 |
| 5 | 3 | 3 |
| 6 | 8 | 4 |
| 7 | 8 | 1 |

In so far, the embodiments described above yield example partitionings of the just-mentioned partitioning. For example, FIG. 4 shows two examples of such a FIPS division of block 80. In this case, however, all sub-partitions 102/112 have the same size. In particular, perpendicular to dimension 104, they are of the block's width, while along dimension 104, they are of equal width, corresponding to a certain fraction of the block's width along dimension 104. Like any of the above partitions 102/112, each of the generated sub-partitions 102 in FIPS is predicted and the resulting residual signal is transformed, quantized and coded individually, for instance. Therefore, its reconstructed values may be used to predict other sub-partitions 102 that have not been coded/decoded yet. For example, in the case of the block 80 depicted in FIG. 12b, sub-partition No. 1 could be predicted first and then its reconstructed samples could be used to predict sub-partitions No. 2 and 3. This process is repeated until all sub-partitions have been coded/decoded.

Summarizing the FIPS generalization, the partitioning of the intra-predicted block 80 into partitions 102/112 may be defined and signaled via the data stream in a manner different than discussed above such as, for instance, using a recursive multi-tree subdivisioning of block 80 into rectangular partitions of varying size or any other possibility of defining the partitioning. For instance, the partitioning could be defined by derivation of dimension 104 as discussed above in order to determine, based thereon, whether the partitions of block 80 are horizontal stripes 102 or vertical stripes 112, and depending on the intra-prediction mode as far as the stripes' transversal width is concerned, i.e., the height of horizontal stripes 102 and the width of vertical stripes 112, respectively. All the other possibilities discussed above remain such as, for instance, the possibility of varying the processing/partition order 126 which variation may depend on, as discussed above, the intra-prediction mode, some syntax element sent in the data stream for block 80 in addition to the intra-prediction mode parameter or in accordance with some other information sent in the data stream such as information derivable from the prediction residual sent in the data stream for the various partitions.

Further, it has already been discussed above that the prediction residual for the various partitions of block 80 is quantized and coded into the data stream sequentially, partition by partition, in an alternating manner relative to the individual intra-predictions of these partitions. This had been described with respect to FIG. 5 as well as with respect to FIGS. 10 and 11. The decoder, however, needs not to perform the decoding by alternating between residual decoding on the one hand and the reconstruction of the various partitions by combining the intra-prediction on the one hand and the prediction residual on the other hand. That is, in decoding a certain block 80, the decoder may decouple the decoding of the prediction residual 120 for the various partitions from the actual reconstruction procedure which includes the individual intra-predictions of the various partitions. See FIG. 5: a decoder may decode from the data stream 14 the prediction residual 120 of all partitions, i.e., prediction residuals $120_1$ to $120_4$ for block 80 in accordance with one processing task, and the decoder may, in accordance with another task, use the prediction residual $120_i$ of partitions $102_i$ so as to reconstruct, in accordance with partition order 126, the inner of block 80 partition by partition. To this end, the decoder performs, in the second task, the intra-prediction for each partition $120_i$ using the block's 80 intra-prediction mode with then adding the prediction residual $120_i$ obtained from the first task and with then continuing the reconstruction of block 80 by stepping to the next partition $120_{i+1}$ in partition order 126 in order to perform spatial prediction followed by reconstruction using the prediction residual of that partition in order to correct the intra-prediction result. The decoder may either perform the first task of deriving the prediction residual 120 from data stream 14 completely before commencing the second task of performing the predictions and prediction corrections using the prediction residual, or the decoder may perform the two tasks in parallel with providing measures to guarantee that the prediction residual $120_i$ of a certain partition $102_i$ is ready at the time it is needed, namely at the time when the prediction result for that partition $102_i$ has been obtained using the block's intra-prediction mode and needs to be corrected. In particular, during the first task or phase, the decoder may perform all the inverse transforms for all non-zero partitions, i.e., all partitions 102 for which the prediction residual $120_i$ is signaled to be non-zero, in parallel.

Just as a side it is noted that according to above embodiments where the residual $120_i$ of the partitions i is quantized in transform domain, it may happen that the reconstructed samples of these partitions may leave, i.e. exceed or succeed, a certain allowed sample value range. As discussed above, they may serve as member of reference samples 118j for partitions j following in order 126. In accordance with an embedment, these samples are left as they are for purposes of predicting the partitions j following in order 126, with performing clipping of these samples of block 80 as a final clipping step for the whole block 80, thereby increasing the implementation friendliness on the side of the decoder, for instance. Thus, in deriving the predictor for a partition $102_i$, a reconstructed sample of partitions preceding this partition $102_i$ according to partition order 126, which is among the one or more already reconstructed samples $118_i$ serving as reference for the current partition, may be used in a not yet clipped state, wherein clipping the reconstructed sample from the not yet clipped state to a state clipped to an allowed sample value range takes place at the end, after having performed the sequential reconstruction, to finally reconstruct the predetermined block. At encoder side, clipping is merely performed for sake of obtaining the reconstructed version of such a sample for serving as a prediction reference for subsequently encoded blocks in order to keep the reference synchronization with the decoder. This final clean-up sort of clipping is, however, only an example, and the clipping could alternatively be performed immediately, i.e. before reconstructed samples of a partition i serve as a reference sample 118j for a subsequently processed partition j.

Among the embodiments discussed so far, one shall be illustrated below using concrete examples. In particular, in accordance with this embodiment, the data stream 14 signals for an intra-coded block 80 by way of a split mode flag 160 whether same is coded using LIP or ISP scheme or not. A corresponding syntax element in the data stream 14 could be named intra_subpartitions_mode_flag. If this flag is one, for instance, the intra-coded block 80 could be coded using LIP or ISP scheme, and the block 80 is coded using normal intra-prediction, otherwise. The LIP or ISP scheme could, for instance, be available for the current intra-coded block 80 only provided that certain one or more conditions are fulfilled. The one or more conditions could, for instance, comprise: the intra-coded block 80 needs be to greater than some minimum size in terms of, for instance, number of samples of block 80, and/or the intra-coded block 80 may not be allowed to exceed a certain dimension, at least both horizontally and vertically, in order to, for instance, not lead to too large transform sizes. To be more precise, it could be that the LSP or ISP mode is available only in case of block 80 being smaller than or equal to the just-mentioned maximum transform-related size in at least one direction, i.e., horizontally or vertically. Thus, intra_subpartitions_mode_flag may only be present in the data stream in case of block 80 fulfilling the just-mentioned conditions. Otherwise, the decoder may infer that the intra-coded block 80 is normally intra-coded. A partition dimension flag 114 may further be signaled for the intra-coded block 80, in case of the split mode flag, intra_subpartitions_mode_flag, indicating that the intra-coded block 80 is an LSP or ISP coded block. It might be, however, that this intra_subpartitions_mode_flag is not explicitly signaled inevitably, but inferred to indicate a certain partition dimension 104 in case of certain situations. For instance, in case of the intra-coded block 80 having a width which exceeds the aforementioned maximum transform size (but having a height which does not), then the partition dimension 104 could be obliged to be horizontal, and in case of the height of block 80 exceeding the just-mentioned maximum transform size (but the width not exceeding the same), dimension 104 could be obliged to be vertical. In both cases, the intra_subpartitions_split_flag would not be signaled explicitly in the data stream, but inferred accordingly by the decoder. The intra-coding mode 116 could be signaled in the data stream as outlined above, namely by use of a list of most probable intra-prediction modes which is constructed on the side of the encoder and decoder. While for LIP or ISP intra-coded blocks 80, the data stream 14 could signal the intra-coding mode by way of an MPM list pointer which points into the list of probably intra-prediction modes inevitably, called, for instance, intra_luma_mpm_IDX, this pointer might be preceded in the data stream 14 by an MPM flag in case of the intra-coded block being not coded in LIP or ISP scheme. If that MPM flag, called, for instance, intra_luma_mpm_flag, has a certain flag state, instead of the pointer into the most probable intra-prediction mode list, a pointer into a reminder list of intra-prediction modes would be signaled in the data stream. As mentioned above, however, this is merely an example, and it might be that the signalable set of intra-prediction modes may be the same, namely cover all supported intra-prediction modes, for both normally coded intra-predicted blocks and LIP or ISP intra-predicted blocks. For instance, the intra_luma_mpm_flag may be sent for both types of intra-coded blocks. Alternatively, the pointer sent for both types of intra-predicted blocks could directly point into a complete list of supported intra-prediction modes, without any MPM flag, for both types of intra-coded blocks. If the intra-coded block 80 is coded using LIP or ISP scheme, the number of partitions 102/112 could be defined as follows. In particular, encoder and decoder may determine the number of partitions depending on the size of block 80. No signal would be spent in the data stream. For small block sizes, the number could be two, whereas the number of partitions 102/112 is four otherwise. The partition order at which intra prediction of the partitions and the coding of the prediction residuum in the data stream are performed, may lead along the partition direction 104 from the left most partition in case of a horizontal direction n14 and the uppermost partition in case of a vertical partition direction sequentially to the farthest partition. No signaling would be spent for this either. The residual transformation could be done, as described above, per partition 102/112. That is, each partition could be transformed separately. Compared thereto, in case of a normally intra-coded block 80, the number of transforms could depend on the sizes of intra-coded block 80 as follows: if the intra-coded block is smaller than the aforementioned maximum transform size horizontally and vertically, the intra-coded block's 80 residual is coded using one transform, i.e., the block's 80 residual is completely subject to one transform. In case of exceeding the maximum transform size horizontally, the intra-coded block 80 is split into two halves or a corresponding number of transform blocks horizontally so that the halfes or the transform blocks meet the maximum transform size and the residuum of block 80 is subject to one transform per half/transform block. The same applies in case of block 80 exceeding the maximum transform size vertically. If exceeding the maximum transform size both vertically and horizontally, four or a corresponding number of transforms are used to transform the residuum of block 80 in the four quadrants of this block 80 or a regular 2-dimensional sub-division of block 80 into a corresponding number of transform blocks. Besides, the treatment of normally intra-coded blocks 80 may deviate from the handling of LIP or ISP coded intra-coded blocks 80 in that normally intra-coded blocks are intra-predicted en block. That is, same are not sub-partitioned. Further differences may relate to the coding of the transform's for coding the prediction residual of block 80. For each transform a coded block flag 188 may be transmitted such as tu_cbf_luma, but while for normally intra-coded blocks 80, this flag might be coded inevitably for each transform within block 80, this flag may be inferred to be one for the last transform of that block 80 in case of block 80 being LIP or ISB coded and all previous CBFs for the previous transforms being zero. Further, the selection of the dimensions of the sub-blocks within each transform may differ between normally intra-coded blocks 80 on the one hand and LIP or ISP coded blocks 80 on the other hand. Details were set out above. Alternatively, however, it could be that the sub-divisioning of the transforms 182 into sub-blocks could be done equally for normally intra-coded blocks and LIP or ISP coded blocks. For instance, let log 2SbW and log 2SbH be the logarithm duals of the width and height of the sub-blocks and log 2TbWidth and log 2TbHeight the width and height of the transform, respectively. Then, the sub-block dimensions could be determined as follows:

```
log2SbW = ( Min( log2TbWidth, log2TbHeight ) < 2 ? 1 : 2 )
log2SbH = log2SbW
if ( log2TbWidth < 2 ) {
    log2SbW = log2TbWidth
    log2SbH = 4 − log2SbW
```

```
} else if ( log2TbHeight < 2 ) {
   log2SbH = log2TbHeight
   log2SbW = 4 - log2SbH
}
```

The above pseudo code yields sub-blocks of sizes set out in Table 1. It might be, that owing to an inherent minimum size of intra-coded blocks 80 and the non-sub-divisioning of normally intra-coded blocks, merely sub-blocks of 4×4 coefficients result for normally intra-coded blocks 80. It should finally be noted that the just-outlined example may lead to LIP or ISP intra-predicted blocks of varying sizes including ones partitioned into only two partitions 102/112, but irrespective of whether such LIP or ISP intra-predicted blocks exist, there are LIP or ISP intra-predicted blocks partitioned into more than two partitions.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A decoder for decoding of a picture from a data stream, the picture comprising a plurality of blocks, the decoder comprising a processor configured to:
   determine an intra-coding mode for a block of the plurality of blocks, wherein the block is partitioned, along a partition dimension, into at least two partitions;
   derive a prediction for a current partition of the block, using the intra-coding mode for the block, based on one or more already reconstructed samples neighboring the current partition,
   determine whether the current partition is a last partition in the block according to a partition order;

in response to a determination that the current partition is not the last partition in the block according to the partition order, decode a partition flag for the current partition from the data stream;

in response to a determination that (i) the current partition is the last partition in the block, according to the partition order, and (ii) a respective partition flag is zero for each previous partition in the block according to the partition order, infer the partition flag for the current partition to be one without decoding it from the data stream;

in response to the partition flag for the current partition being equal to one, decode transform coefficients for the current partition from the data stream;

in response to the partition flag for the current partition being equal to zero, infer the transform coefficients for the current partition to be zero; and reconstruct the current partition based on the prediction and the transform coefficients.

2. The decoder of claim 1, wherein to reconstruct the current partition of the block, the processor is configured to:
perform an inverse transform on the transform coefficients to obtain a prediction residual for the current partition; and
combine the prediction and the prediction residual.

3. The decoder of claim 1, wherein the processor is configured to:
decode the partition flag for the current partition from the data stream using context-dependent entropy decoding using a context that depends on a coded partition flag decoded for a partition preceding the current partition according to the partition order.

4. The decoder of claim 1, the processor further configured to decode a first flag indicating that the block is partitioned into the at least two partitions.

5. The decoder of claim 4, wherein based on the first flag indicating that the block is partitioned into the at least two partitions, the decoder is further configured to entropy decode a second flag indicating whether the block is partitioned vertically or horizontally.

6. The decoder of claim 1, wherein the processor is configured to determine a width of the at least two partitions based on a size of the block.

7. The decoder of claim 1, wherein the at least two partitions is four partitions.

8. A method of decoding of a picture from a data stream, the picture comprising a plurality of blocks, the method comprising:
determining an intra-coding mode for a block of the plurality of blocks, wherein the block is partitioned, along a partition dimension, into at least two partitions;
deriving a prediction for a current partition of the block, using the intra-coding mode for the block, based on one or more already reconstructed samples neighboring the current partition,
determining whether the current partition is a last partition in the block according to a partition order;
in response to a determination that the current partition is not the last partition in the block according to the partition order, decoding a partition flag for the current partition from the data stream;
in response to a determination that (i) the current partition is the last partition in the block, according to the partition order, and (ii) a respective partition flag is zero for each previous partition in the block according to the partition order, inferring the partition flag to be one without decoding it from the data stream;

in response to the partition flag for the current partition being equal to one, decoding transform coefficients for the current partition from the data stream;
in response to the partition flag for the current partition being equal to zero, inferring the transform coefficients for the current partition to be zero; and
reconstructing the current partition based on the prediction and the transform coefficients.

9. The method of claim 8, wherein reconstructing the current partition comprises
performing an inverse transform on the transform coefficients to obtain a prediction residual for the current partition; and
combining the prediction and the prediction residual.

10. The method of claim 8, wherein the partition flag for the current partition is decoded from the data stream using context-dependent entropy decoding using a context that depends on a coded partition flag decoded for a partition preceding the current partition according to the partition order.

11. The method of claim 8, the method further comprising decoding a first flag indicating that the block is partitioned into the at least two partitions.

12. The method of claim 11, wherein based on the first flag indicating that the block is partitioned into the at least two partitions, the method further comprises entropy decoding a second flag indicating whether the block is partitioned vertically or horizontally.

13. The method of claim 8, further comprising determining a width of the at least two partitions based on a size of the block.

14. The method of claim 8, wherein the at least two partitions is four partitions.

15. A non-transitory computer readable medium comprising instructions for decoding a picture from a data stream, the picture comprising a plurality of blocks, the instructions, when executed by a computer, causing the computer to:
determine an intra-coding mode for a block of the plurality of blocks, wherein the block is partitioned, along a partition dimension, into at least two partitions;
derive a prediction for a current partition of the block, using the intra-coding mode for the block, based on one or more already reconstructed samples neighboring the current partition,
determine whether the current partition is a last partition in the block according to a partition order;
in response to a determination that the current partition is not the last partition in the block according to the partition order, decode a partition flag for the current partition from the data stream;
in response to a determination that (i) the current partition is the last partition in the block, according to the partition order, and (ii) a respective partition flag is zero for each previous partition in the block according to the partition order, infer the partition flag to be one without decoding it from the data stream;
in response to the partition flag for the current partition being equal to one, decode transform coefficients for the current partition from the data stream;
in response to the partition flag for the current partition being equal to zero, infer the transform coefficients for the current partition to be zero; and
reconstruct the current partition based on the prediction and the transform coefficients.

16. The non-transitory computer readable medium of claim 15, wherein reconstruct the current partition comprises perform an inverse transform on the transform coefficients to obtain a prediction residual for the current partition; and combine the prediction and the prediction residual.

17. The non-transitory computer readable medium of claim 15 further comprising instructions, when executed by the computer, cause the computer to:

decode the partition flag for the current partition from the data stream using context-dependent entropy decoding using a context that depends on a coded partition flag decoded for a partition preceding the current partition according to the partition order.

18. The non-transitory computer readable medium of claim 15 further comprising instructions, when executed by the computer, cause the computer to decode a first flag indicating that the block is partitioned into the at least two partitions.

19. The non-transitory computer readable medium of claim 18, further comprising instructions, when executed by the computer, cause the computer to, based on the first flag indicating that the block is partitioned into the at least two partitions, entropy decode a second flag indicating whether the block is partitioned vertically or horizontally.

20. The non-transitory computer readable medium of claim 15, wherein the at least two partitions is four partitions.

* * * * *